United States Patent
Yusoff et al.

(10) Patent No.: US 7,136,559 B2
(45) Date of Patent: Nov. 14, 2006

(54) OPTICAL FIBRE-BASED DEVICES UTILISING THE RAMAN EFFECT

(75) Inventors: Zulfadzli Yusoff, Southampton (GB); Walter Belardi, Southampton (GB); Peh Chiong Teh, Southampton (GB); Ju Han Lee, Southampton (GB); Tanya Mary Monro, Southampton (GB); David John Richardson, Southampton (GB)

(73) Assignee: University of Southampton, Hampshire (GB)

( * ) Notice: Subject to any disclaimer, the term of this patent is extended or adjusted under 35 U.S.C. 154(b) by 0 days.

(21) Appl. No.: 10/490,907

(22) PCT Filed: Sep. 27, 2002

(86) PCT No.: PCT/GB02/04400

§ 371 (c)(1),
(2), (4) Date: Feb. 3, 2005

(87) PCT Pub. No.: WO03/029851

PCT Pub. Date: Apr. 10, 2003

(65) Prior Publication Data

US 2005/0147370 A1    Jul. 7, 2005

(30) Foreign Application Priority Data

Sep. 28, 2001 (GB) ................................ 0123366.7
Sep. 28, 2001 (GB) ................................ 0123474.9

(51) Int. Cl.
*G02B 6/032* (2006.01)

(52) U.S. Cl. ......................... 385/125; 385/31; 385/27

(58) Field of Classification Search .................... None
See application file for complete search history.

(56) References Cited

U.S. PATENT DOCUMENTS 5,499,134 A * 3/1996 Galvanauskas et al. ..... 359/333

(Continued)

FOREIGN PATENT DOCUMENTS

WO          00/72067          11/2000

OTHER PUBLICATIONS

Hansen, P.B. et al. "Capacity Upgrades of Transmission Systems by Raman Amplification." *Photonics Technology Letters.* 9.2 (1997): 262-264.

(Continued)

*Primary Examiner*—Sung Pak
(74) *Attorney, Agent, or Firm*—Renner, Otto, Boisselle & Sklar, LLP

(57) ABSTRACT

An optical fibre device based on the Raman effect comprises a first optical source to provide light at a first wavelength, and a holey optical fibre which receives the light from the first optical source such that optical gain or loss is provided at a second wavelength by the effect of Raman scattering within the fibre. For optical gain, the second wavelength is longer than the first wavelength, and the device can be operated as an amplifier, or as a laser if optical feedback is provided. For optical loss, the second wavelength is shorter than the first, and the device may be used as an optical modulator. The fibre may be fabricated from pure silica, although other undoped or doped materials may alternatively be used to tailor properties of the fibre such as gain spectrum, bandwidth, power handling capability and mode propagation.

36 Claims, 26 Drawing Sheets

U.S. PATENT DOCUMENTS

| | | | |
|---|---|---|---|
| 6,693,740 B1* | 2/2004 | Gray et al. | 359/337.4 |
| 2002/0168161 A1* | 11/2002 | Price et al. | 385/123 |
| 2003/0035207 A1* | 2/2003 | Gray et al. | 359/344 |
| 2004/0233941 A1* | 11/2004 | Fajardo et al. | 372/6 |
| 2005/0225841 A1* | 10/2005 | Bragheri et al. | 359/334 |

OTHER PUBLICATIONS

Ilev, Ilko K. et al. "Double-Pass Fiber Raman LAser—A Powerful and Widely Tunable in the Ultraviolet, Visible, and Near-Infared Fiber Raman Laser for Biomedical Investigations." *Journal of Selected Topics in Quantum Electronics*. 5.4 (1999): 1013-1018.

Burdge, Geoff et al. "Ultrafast intensity modulation by Raman gain for all-optical in-fiber processing." *Optics Letters*. 23.8 (1998): 606-608.

Stolen, Rogers H. "Nonlinearity in Fiber Transmission." *Proceedings of the IEEE*. 68.10 (1980): 1232-1236.

Davey, S.T. et al. "Optical gain spectrum of $GeO_2$-$SiO_2$ Raman fibre amplifiers." *IEE Procedings*. 136.J.6 (1989): 301-306.

Kunota, H. et al. "Low-loss 2 km-long photonic crystal fiber with zero GVD in the near IR suitable for picosecond pulse propagation at the 800 nm band." *Conference on Lasers and Electro-Optics*. Number CPD3 (2001): 1-2.

Monro, Tanya M. et al. "New possibilities with holey fibres." *Optical Fibre Communications Conference*. Number ThG4 (2000): 106-108.

Birks, T.A. et al. "Endlessly single-mode photonic crystal fiber." *Optics Letters*. 22. 13 (1997): 961-963.

Knight, J.C. et al. "Large mode area photonic crystal fibre." *Electronics Letters*. 34. 13 (1998): 1347-1348.

Monro, Tanya M. et al. "Holey optical fibers: an efficient modal model." *Journal of Lightwave Technology*. 17.6 (1999): 1093-1102.

Kjeldsen, P.M. et al. "SRS induced depletion of 1540 nm signal co-propagating with 1630 nm OTDR pulses." *Electronics Letters*. 32.20 (1996): 1914-1916.

Furusawa, K. et al. "A mode-locked ytterblum doped holey fiber laser." *Optical Society of America/Institute of Electrical and Electronics Engineers*. 56 (2001): 319-320.

Price, J.H. V. et al. "Tunable, femtosecond pulse source operating in the range 1.06-1.33 µm based on an $Yb^{3+}$-doped holey fiber amplifier." *J. Opt. Soc. Am. B*. 19.6 (2002): 1286-1294.

Yusoff, Z. et al. "Raman effects in a highly nonlinear holey fibre: amplification and modulation." *Optics Letters*. 27.6 (2002):424-426.

van Eijkelenborg, Martin A. et al. "Optimising holey fibre characteristics." *Technical Digest CLEO/Pacific Rim*. (2001):I-436-I-437.

Broderick, N.G.R. et al. "Nonlinearity in holey optical fibres: measurement and future opportunities." *Optics Letters*. 24.2(1999):1395-1397.

Coen, Stéphane et al. "White-light supercontinuum generation with 60-ps pump pulses in a photonic crystal fiber." *Optics Letters*. 26.17(2001):1356-1358.

Petropoulos, P. et al. "2R-regenerative all-optical switch based on a highly nonlinear holey fiber." *Optics Letters*. 26.16(2001):1233-1235.

Champert, P.A. et al. "Multiwatt average power continua generation in holey fibers pumped by kilowatt peak power seeded ytterbium fiber amplifier." *Applied Physics Letters*. 81.12(2002):2157-2159.

\* cited by examiner

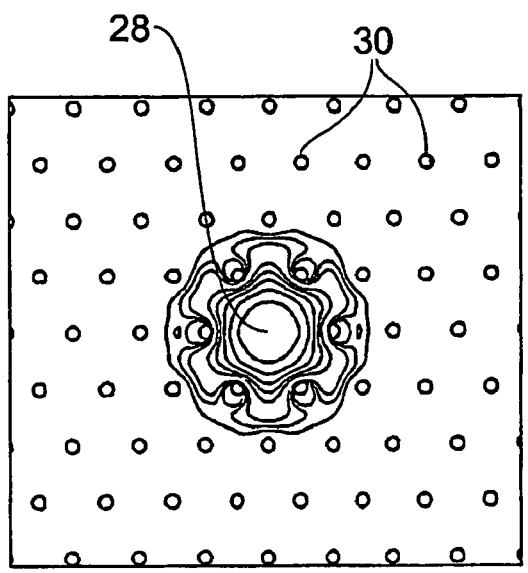
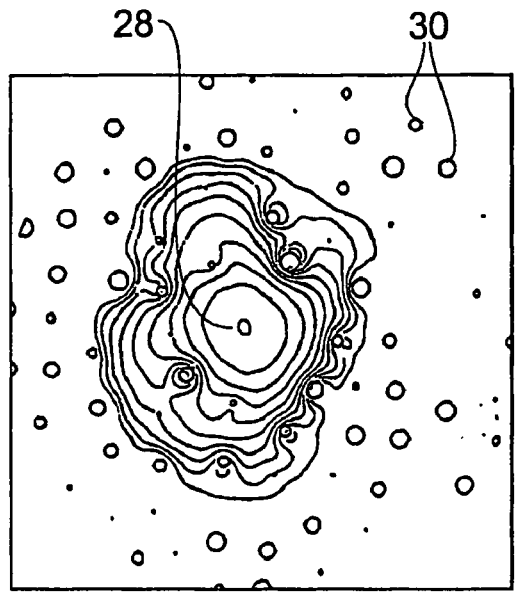
Fig. 7(a)  Fig. 7(b)
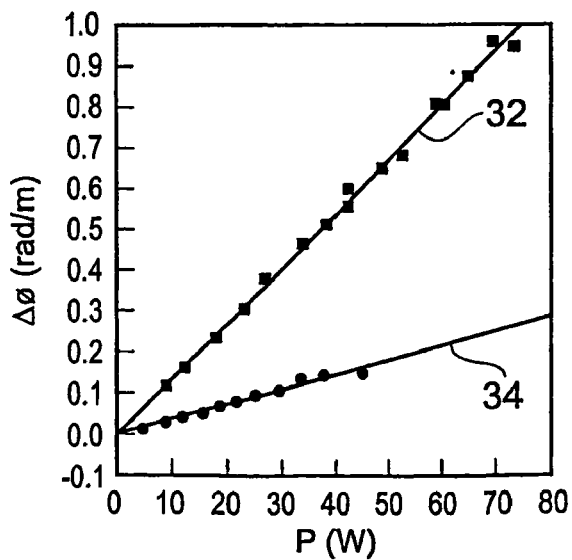
Fig. 8
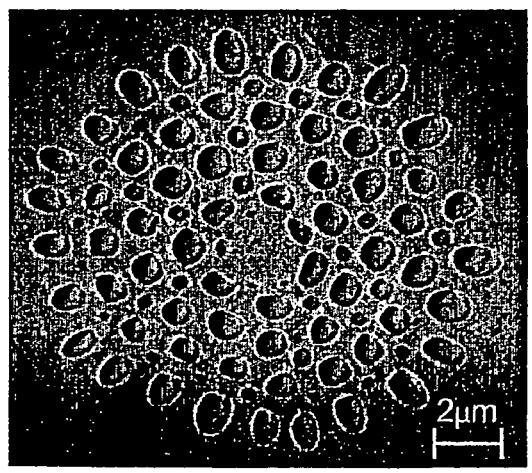
Fig. 9

OPTICAL FIBRE-BASED DEVICES UTILISING THE RAMAN EFFECT

This application is a national phase of International Application No. PCT/GB02/04400 filed Sep. 27, 2002 and published in the English language.

BACKGROUND OF THE INVENTION

The present invention relates to optical fibre-based devices which utilise Raman scattering. In particular, the devices include optical amplifiers, optical modulators and lasers.

The capability of silica optical fibres to carry large amounts of information over long repeaterless spans in telecommunications systems makes lightwave communications very attractive. Numerous channels at different wavelengths can be multiplexed on the same fibre to maximise the use of the available bandwidth. Higher transmission powers and/or lower loss fibres can increase system margins.

A device commonly used to compensate for the losses in fibre is the erbium-doped fibre amplifier (EDFA). This is based on silica fibre doped with erbium, which, when pumped with light of a suitable wavelength, provides optical gain and hence amplification of optical signals passing through the fibre. The properties of erbium mean that the bandwidth of the available gain is approximately 30 to 40 nm around 1550 nm. This places a severe limitation on the bandwidth of the telecommunications system as a whole, because only optical signals within this wavelength range can be adequately transmitted.

Also, attempts to fully utilise the capabilities of silica fibres for telecommunications applications tend to be limited by nonlinear interactions between information-bearing optical signals travelling in the fibre, and the fibre itself. These optical nonlinearities can lead to distortion, excess attenuation and interference of the optical signals, resulting in system degradations. There are many nonlinear optical effects in fused silica fibres, each of which have unique properties. Generally, these nonlinear effects can be divided into two categories. The first relates to elastic phenomena. In an optical fiber the core in which the optical signals travel has a specific refractive index that determines how fast light travels through it. However, depending upon the intensity of light travelling in the core, this refractive index can change. This intensity-dependence of the refractive index is called the Kerr effect. It can cause self-phase modulation (SPM) of a signal, whereby light at one wavelength channel can broaden out spectrally onto adjacent wavelength channels through its own self action within the medium. It can also cause cross-phase modulation (XPM), whereby several different wavelengths in a WDM system can cause each other to spectrally broaden and spread out. Finally, it can result in four-wave mixing (FWM), in which two or more signal wavelengths can interact to create a new wavelength. A second category of nonlinear effects results from stimulated inelastic scattering, in which energy is exchanged between the electromagnetic field and the dielectric medium. Effects in this category are stimulated Raman scattering (SRS) and stimulated Brillouin scattering (SBS), which are related to the excitation of vibrational modes of silica. The main difference between the two is that optical phonons participate in SRS while acoustic phonons participate in SBS.

Many nonlinear effects can be problematic for telecommunications systems. However, SRS can be used for optical amplification, as an alternative to EDFAs.

The Raman effect is described quantum-mechanically as a scattering of an incident photon by a molecule to a lower frequency photon while at the same time the molecule makes a transition between vibrational modes. SRS occurs when the incident photons are contained in a very intense pump wave. This results in very high Raman gain such that much of the pump energy is transferred to light at the lower frequency, called the Stokes wave. This nonlinear process can turn optical fibers into broadband Raman amplifiers [1], Raman lasers [2] and also SRS-based modulators [3]. On the other hand, it can also limit the performance of multichannel lightwave systems by transferring energy from one channel to red-shifted neighbouring channels.

A Raman amplifier provides an attractive and convenient choice of broadband optical amplifier due to the fact that the bandwidth of the gain can be tuned by simply changing the pump wavelength. The gain can be tailored to a desired communications wavelength, hence overcoming the drawback of the narrow gain bandwidth capabilities of EDFAs. Thus, particular interest in Raman amplifiers lies in the optical communication bands (short (S) band and long (L) band) outside the conventional EDFA gain window (C band). Moreover, by pumping such amplifiers with a combination of different pump wavelengths it is possible to further extend and shape the available gain bandwidth.

A problem with the Raman amplifier is that it requires a high power pump laser. However, the recent availability of high power lasers (typically ~b 5 W) in the 1400 nm region makes Raman amplification in the desired S. C and L bands possible. A further drawback of the Raman amplifier is the need for long lengths of fibre (~10 km), which increases the bulk and cost of these devices.

It is thus desired to provide an optical fibre amplifier which addresses the disadvantages of known devices, in particular problems relating to fibre length and limited bandwidth.

SUMMARY OF THE INVENTION

A particular problem associated with the long fibre lengths required in standard fibre Raman devices is Rayleigh back-scatter. This is especially true of distributed Raman amplifiers in telecommunications networks. Propagating light at all wavelengths is scattered in a backwards direction from small-scale irregularities in the glass from which the fibre is made; further, the backscattered light can itself be scattered (double Rayleigh backscatter), and then interferes with the co-propagating signal. This is a major source of loss and noise, and increases with fibre length, as more scattering incidents can occur in the course of propagation.

Holey optical fibre has a much greater nonlinearity than the standard optical fibre used in such Raman devices, typically between ten and a hundred times higher for silica fibre. This means that a useful and beneficial level of optical gain or loss can be achieved via the Raman effect in holey fibre by using a much shorter length of fibre than is required to provide the same amount of gain or loss from a standard fibre. For example, device lengths as short as tens of meters or less are possible using holey fibre, compared with typically 10 km lengths of conventional fibre. Thus, it is expected that Rayleigh backscattering will be significantly reduced by making use of holey fibre as a Raman gain medium.

Accordingly, a first aspect of the present invention is directed to an optical fibre device which, in use, utilises the Raman effect, comprising:

a holey optical fibre with a structure which allows the fibre to guide light at a first wavelength and a second longer wavelength and which results in energy transfer of light at the first wavelength propagating in the fibre to the second wavelength by the nonlinear optical process of Raman scattering within the fibre such that the ratio of optical power within the fibre at the second wavelength to optical power within the fibre at the first wavelength is increased;

a first optical source operable to emit light at the first wavelength with a first power level; and a coupler operable to couple light from the first optical source into the holey optical fibre so that the light undergoes Raman scattering.

The reduced device length offers a number of further advantages, including reduced device bulk, potentially lower cost, and lower overall background loss. The smaller size makes packaging of the devices more convenient, and also gives a higher operating stability as sensitivity to environmental disturbance is reduced. Also, a higher value of transmission loss per unit length in the fibre can be tolerated, as the overall loss is likely to be reduced. Additionally, the greater nonlinearity and consequent gain offered by holey fibres permits the use of lower power pump sources than are required in standard Raman devices. This further reduces the cost, and potentially allows convenient readily available laser devices to be used.

The present invention thus offers the many benefits of conventional Raman devices, such as tunable and broadband gain or loss, but avoids some of the drawbacks caused by the use of standard fibre. Also, holey fibre is extremely versatile and offers many advantageous characteristics which can further improve Raman devices. The effective nonlinearity per unit length is defined largely by the fibre structure rather than being a simple material property, and so can be precisely tailored to suit a particular application by adjusting the size and distribution of the fibre holes. In a similar way, the mode propagating characteristics can be engineered as needed. Holey fibre can be made from a single material, because the required refractive index variation also derives from the holes, instead of being provided by materials of different index as in a standard fibre. This can give holey fibre an improved power handling capability. On the other hand, the use of multi-material structures having a variation of material across the fibre cross-section is not precluded, and may if desired be used to further tailor the properties of the holey fibre for gain distribution across the fibre transverse mode. A range of different doped and undoped materials can be used, thus providing a selection of Raman gain spectra, depending on the Raman properties of the materials in question. Doping can be used to modify the gain spectrum, or to provide varying gain over the fibre mode profile.

In accordance with one embodiment, the optical fibre device is configured to be operable as an optical fibre amplifier, and further comprises:

a coupler operable to couple light at the second wavelength with a second power level less than the first power level into the holey optical fibre;

the effect of the Raman scattering of the light from the first optical source being to provide optical gain at the second wavelength so that light at the second wavelength propagating within the fibre is amplified.

Fibre amplifiers based on the Raman effect are a useful alternative to the widely used erbium doped fibre amplifier (EDFA), particularly for telecommunications applications. The gain has a much greater bandwidth and is tunable, so allows access to a greatly increased range of signal wavelengths, thus increasing network capacity. However, the long lengths of standard fibres required to achieve an appreciable degree of amplification are disadvantageous, particularly with regard to the problem of Rayleigh backscatter as discussed above. The present invention addresses these drawbacks, by providing a Raman amplifier which can have a vastly reduced device length compared to known devices.

When configured as an amplifier, the optical fibre device may further comprise a second optical source operable to emit light at the second wavelength with the second power level, the coupler being configured to couple light from the second optical source into the holey optical fibre.

Alternatively, the optical fibre device may be configured to be operable as a distributed amplifier for use in a telecommunications system, in which the coupler is arranged to couple optical signals at the second wavelength into the holey optical fibre so that said optical signals experience optical gain and are amplified while being transmitted along the holey optical fibre.

The optical fibre device may further comprise a second optical fibre amplifier operable to receive and amplify light at a third wavelength; and an output coupler operable to receive amplified light at the second wavelength from the optical fibre device and amplified light at the third wavelength from the second optical fibre amplifier, and to combine the amplified light into a single output. The second optical fibre amplifier can be used to extend the gain profile of the holey fibre Raman amplifier, for example by providing gain with a peak which partially overlaps the gain peak of the Raman amplifier. The optical amplifying device may be one of: an erbium doped fibre amplifier; an ytterbium doped fibre amplifier; an erbium/ytterbium doped fibre amplifier; a praseodymium doped fibre amplifier; a thulium doped fibre amplifier; or a semiconductor optical amplifier.

The optical fibre device may further comprising one or more additional optical sources operable to emit light at the first wavelength, and a coupler operable to couple light from the one or more additional optical sources into the holey optical fibre so as increase the optical gain provided at the second wavelength. This is a simple way to optimise the output of the amplifier. For example, a number of low cost readily available reliable optical pump sources can be combined to provide the required power and gain levels. Additionally, additional pump sources provide a degree of pump redundancy, allowing the amplifier to continue to operate in the event of failure of one or more of several pump sources.

Alternatively, the optical fibre device may further comprising one or more additional optical sources operable to emit light at one or more wavelengths different from the first wavelength, and a coupler operable to couple light from the one or more additional optical sources into the holey optical fibre so that the light undergoes Raman scattering and provides gain at one or more wavelengths different from the second wavelength. This arrangement allows the overall gain of the amplifier to be extended and/or tailored by overlapping the gain profiles provided by the various pump wavelengths. For example, an amplifier with a substantially flat gain profile can be provided.

In a further embodiment, the optical fibre device is configured to be operable as an optical modulator, and further comprises:

a second optical source operable to emit light at the second wavelength with a second power level greater than the first power level; and a coupler operable to couple light from the second optical source into the holey optical fibre;

the effect of the Raman scattering of the light from the first optical source being to cause optical loss at the first wavelength so the first power level is reduced.

When configured as a modulator, the second optical source is preferably operable to emit light at the second wavelength in the form of pulses, so that the optical loss varies in time. The Raman effect has been found to be a useful way of modulating an optical signal, by inducing an optical loss which follows the amplitude of a pump wave, so that amplitude modulations of the pump are inversely imprinted on a shorter wavelength signal. The use of holey fibre as the Raman medium offers many of the same advantages as holey fibre in a Raman amplifier, including reduced device length.

The pulses preferably have a duration of between 1 femtosecond and 100 nanoseconds, and more preferably have a duration of between 1 picosecond and 100 picoseconds. The Raman effect has a very fast response time, typically less than 10 fs. This makes the use of ultrashort modulation pulses viable, leading to a modulator that can handle data for signal processing applications requiring bit rates of the order of 500 Gbit/s or more.

In accordance with an alternative embodiment, the optical fibre device is configured to be operable as an optical fibre laser, the effect of the Raman scattering being to provide optical gain at the second wavelength so that light at the second wavelength generated by the stimulated Raman scattering of the light from the first optical source is amplified;

the device further comprising:
one or more reflective elements having reflectivity at the second wavelength and arranged to cause multiple passes through the holey optical fibre of the light at the second wavelength so that laser action at the second wavelength is achieved.

The above-mentioned advantages of applying holey fibres to Raman amplifiers apply equally to Raman lasers. Size reduction of laser devices of all kinds is a topic of great interest, and allows for ease of integration with other optical components.

The laser may be configured in a number of ways. For example, the reflective elements may comprise a pair of mirrors or bulk gratings arranged externally to the holey optical fibre, or Fresnel reflections from the end facets of the fibre, or a combination of these. Such arrangements can be used to give a laser of the Fabry-Perot type. Also, the laser may be a ring laser, in which the holey optical fibre is arranged in a ring configuration to allow light at the second wavelength to circulate around the ring.

Alternatively, the reflective elements may comprise a pair of fibre Bragg gratings written into the holey optical fibre. This gives a particularly stable, robust device with a repeatable performance, as alignment difficulties associated with external reflectors are avoided. Operation of the laser may be extended via a Raman cascade, if the laser further comprises one or more pairs of fibre Bragg gratings written into the holey optical fibre, and having reflectivities at one or more wavelengths longer than the second wavelength, so as to reflect light which is generated by Raman scattering of light at the second wavelength propagating within the fibre to the one or more longer wavelengths.

In any embodiment, the holey optical fibre may have a length within one of the following ranges 10 meters to 10,000 meters; 10 meters to 100 meters, or between 10 meters and 1000 meters, or between 100 meters and 1000 meters. However, lengths outside these ranges may be suitable for particular applications. The appropriate length for any application will be determined by factors including how much gain is required and how much transmission loss can be tolerated.

The holey optical fibre may be fabricated from silica. Pure silica is well suited for the fabrication of high quality holey fibres, and can result in fibres which have a higher power handling capability than standard fibres.

The holey optical fibre may comprise material doped with ions of one or more of: germanium, phosphorus, boron, tin, lead, bismuth, antimony, erbium, ytterbium and aluminum. Doping can be used to tailor various properties of the fibre, which have an effect of the resulting Raman gain or loss. For example, germanium doping in silica increases the nonlinearity of the holey fibre, and by confining it to the core, gives higher Raman gain for the fundamental mode of the holey fibre.

Alternatively, the holey fibre may be fabricated from a compound glass. These materials typically have a higher refractive index than silica, and also higher nonlinear properties. Thus higher Raman gain can be achieved. For example, the compound glass may be gallium lanthanum sulphide glass. This material has around ten times the nonlinearity of silica, allowing device lengths to be shortened still further. The holey optical fibre may have a length of between 1 and 10 meters.

Holey optical fibres can also be designed to have large mode (core) areas. Hence, in a further embodiment, the holey optical fibre may be a large core area fibre, having a core region with an area greater than 100 $\mu m^2$. This offers advantages for high power Raman laser and Raman amplifier applications since the power levels at the fibre facets can be increased without thereby increasing susceptibility to facet damage.

The nonlinearity of the holey optical fibre can be extensively varied by modifying the fibre structure. In any of the aforementioned embodiments, the holey optical fibre may have an effective optical nonlinearity greater than 20 $W^{-1}km^{-1}$. To achieve this the holey optical fibre may have a structure comprising holes with a cross-sectional diameter d and a hole-to-hole spacing $\Lambda$ such that $d/\Lambda>0.6$. Furthermore, the spacing $\Lambda$ may be <4 $\mu m$, <3 $\mu m$, <2 $\mu m$ or <1.5 $\mu m$.

The holey optical fibre may further have a structure such that it provides endless single mode propagation at at least the first wavelength and the second wavelength. The use of holey fibre as a Raman medium is further advantageous in that a particular feature of holey fibres is that they can offer single mode guidance over an extended wavelength range. Such fibres are often known as endlessly single mode fibres. This is a unique and highly advantageous feature of holey fibre technology. As regards embodiments of the present invention, light at both the first and second wavelengths can be transmitted as a fundamental mode over the whole fibre length, which gives increased interaction and hence greater efficiency due to high mode overlap, and also a good quality output beam. System stability can also be improved. Endlessly single mode holey fibre is of further advantage for Raman devices based on cascaded effects, in which additional wavelengths are generated from stimulated Raman scattering of the first Stokes wave, since the fibre is single mode at all the wavelengths concerned, both those generated and those injected into the device.

To provide such endlessly single mode operation, the holey optical fibre may have a structure comprising holes with a cross-sectional diameter d and a hole-to-hole spacing $\Lambda$ such that $d/\Lambda<0.3$. Alternatively, $d/\Lambda<0.3$ and $\Lambda>5$ $\mu m$, or d/Λ<0.2 and Λ>5 μm, or d/Λ<0.1 and Λ>5 μm. Alternatively, in which the holey optical fibre is effectively endlessly single mode fibre.

A second aspect of the present invention is directed to a method of amplifying light at a second wavelength, comprising:
providing light at a first wavelength with a first power level;
providing light at a second wavelength which is longer than the first wavelength with a second power level which is less than the first power level;
launching the light at the first wavelength and the light at the second wavelength into a holey optical fibre with a structure which allows the fibre to guide light at a first wavelength and a second longer wavelength and which results in energy transfer of the light at the first wavelength to the second wavelength by the nonlinear optical process of Raman scattering within the fibre and hence provides optical gain at the second wavelength, so that the light at the second wavelength experiences the optical gain and is amplified.

A third aspect of the present invention is directed to a method of modulating the amplitude of light at a first wavelength, comprising:
providing light at a first wavelength with a first power level;
providing light of a varying amplitude at a second wavelength which is longer than the first wavelength and with a maximum power level which is greater than the first power level;
launching the light at the first wavelength and the light at the second wavelength into a holey optical fibre with a structure which allows the fibre to guide light at a first wavelength and a second longer wavelength and which results in energy transfer of the light at the first wavelength to the second wavelength by the nonlinear optical process of Raman scattering within the fibre and hence provides optical loss at the first wavelength which varies in time, so that the light at the first wavelength experiences the varying optical loss and is modulated.

BRIEF DESCRIPTION OF THE DRAWINGS

For a better understanding of the invention and to show how the same may be carried into effect reference is now made by way of example to the accompanying drawings in which:

FIGS. 7(a), 7(b) and 7(c) show cross-sectional views of holey fibres with periodic and random arrays of holes;

FIG. 8 shows a graph of measured nonlinear phase shift for a holey fibre and a dispersion shifted fibre;

FIG. 9 shows a scanning electron micrograph of a holey fibre used in embodiments of the invention;

DETAILED DESCRIPTION

Theoretical Background

Stimulated Raman Scattering

Raman scattering occurs when an optical wave is incident on scattering centres in an optically nonlinear medium. The scattering process results in absorption of some of the wave's energy, and scattering of the light. Because of the energy absorption, the scattered light has a lower energy than the incident light, and hence a longer wavelength, called the Stokes wavelength. In the presence of an intense incident wave, the scattering is said to be stimulated. If, additionally, light at the Stokes wavelength is also incident, the scattered light is in phase with this further light. In effect, energy at the shorter wavelength is transferred to the longer wavelength, so that the wave at the Stokes wavelength is amplified. This process forms the basis of the operation of a Raman amplifier, in which pump light is introduced into an optical fibre and provides optical gain and amplification of a signal, or probe, wave at a longer wavelength.

Figure 1:
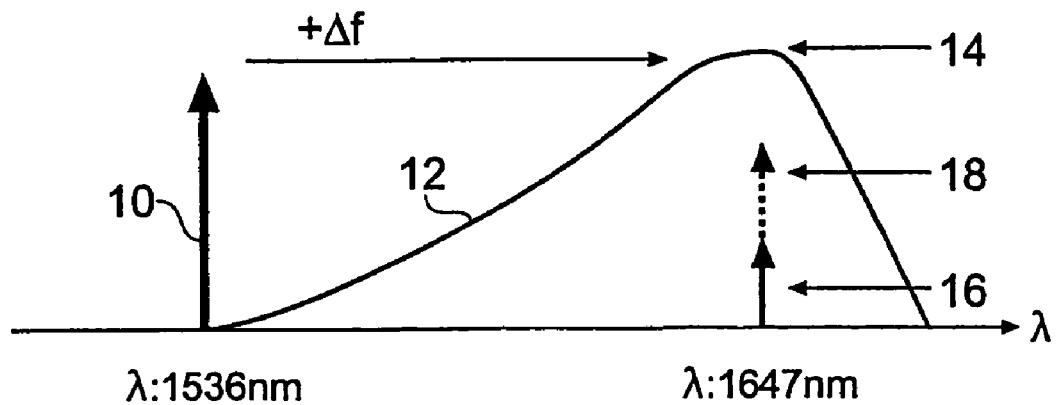
FIG. 1 shows a schematic depiction of optical gain arising from stimulated Raman scattering.

FIG. 1 shows a schematic depiction of the amplification process for an example pump wavelength of 1536 nm and an example Stokes or probe wavelength of 1647 nm. The difference between the two, labelled as $+\Delta f$, is called the Stokes shift. An intense pump beam 10 at 1536 nm produces optical gain 12 over a range of wavelengths, with a peak 14 at 1647 nm. Hence, an incident probe beam 16 at 1647 nm experiences the gain and is amplified to a greater power level 18.

Figure 2:
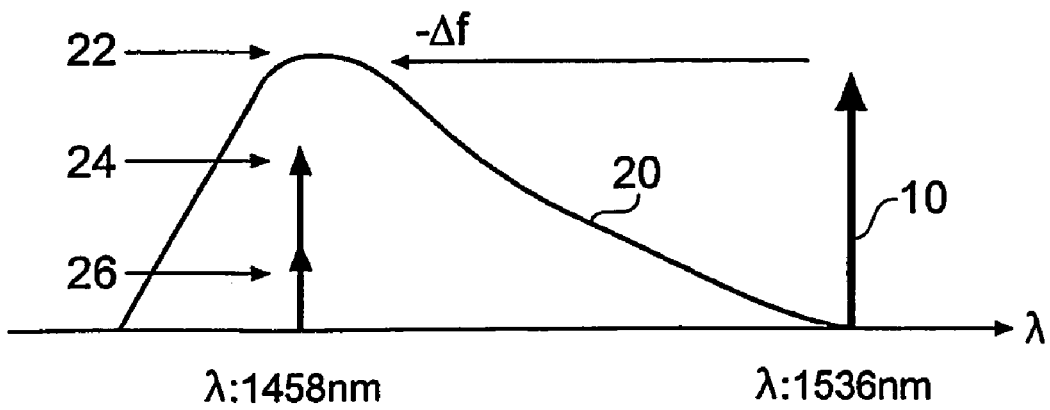
FIG. 2 shows a schematic depiction of optical loss arising from stimulated Raman scattering.

FIG. 2 shows a schematic depiction of the opposite process. In this case, the intense pump beam 10 at 1536 nm produces optical loss 20 with a peak 22 at a shorter wavelength, 1458 nm. An incident probe beam 24 at 1458 nm undergoes stimulated Raman scattering and hence experiences this loss, and is reduced to a lower power level 26. The wavelength or frequency difference between the intense wavelength and the shorter depleted wavelength, labelled as $-\Delta f$, is called the anti-Stokes shift. The loss or depletion can be used to form the basis of an optical modulator, in which an optical signal at a shorter wavelength is modulated by experiencing periodic loss in the presence of a more intense longer wavelength carrying information.

Returning to the case of optical gain, for continuous wave (cw) and quasi-cw operation, the initial growth of a Stokes wave in the presence of an intense pump wave in a lossless fibre with no pump depletion or dispersion effects is described by the following equation:

$$dI_s/dz = g_R I_p I_s \quad (1)$$

where z is position along the fibre, $I_s$ is the intensity of the Stokes wave, $I_p$ is the pump intensity and $g_R$ is the gain coefficient of the stimulated Raman scattering (Raman gain coefficient).

Figure 3:
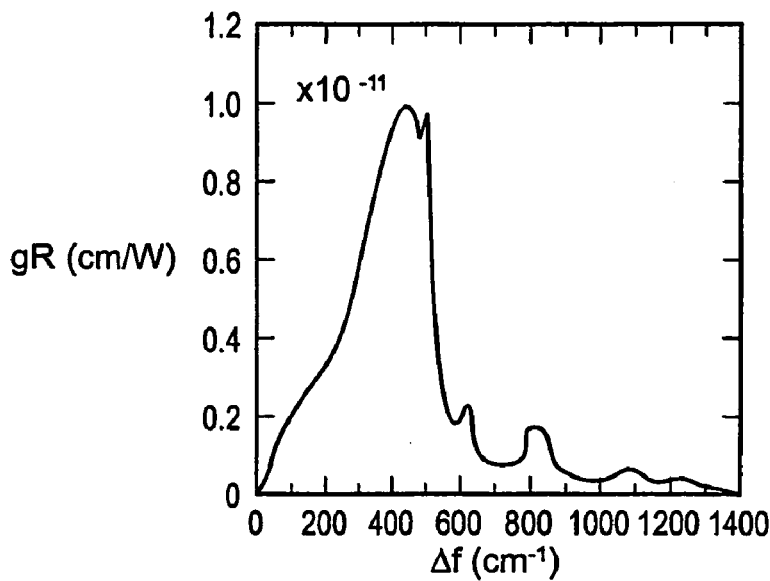
FIG. 3 shows a graph of Raman gain in fused silica for a pump wavelength of 1 μm.

FIG. 3 shows the spectrum of the Raman gain $g_R(\Omega)$ for fused silica at a pump wavelength of 1 μm [4]. The maximum gain is $1 \times 10^{-13}$ m/W. This value is found to vary inversely with pump wavelength, which gives tunability to the gain of a Raman amplifier, because the pump wavelength can be selected to give maximum gain at the probe wavelength of interest (e.g. the desired optical signal wavelength in the case of a telecommunications network). The gain is an important quantity for describing SRS. It depends on the fibre core composition and can vary significantly with various dopants which the fibre may contain (thus allowing the gain spectrum to be tailored by engineering of the fibre), although the spectral shape does not vary appreciably with wavelength. In silica, the Raman gain spectra is very broad, extending up to 40 THz. This is because of the amorphous nature of fused silica, where the molecular vibrational frequencies spread out into bands that overlap and thus create a continuum. The spectrum has a broad peak near 13 THz with a linewidth of ~250 cm$^{-1}$, which makes silica fibres well-suited for use as broadband amplifiers. This should be contrasted with the much narrower gain bandwidth of C-band EDFAs, which provide gain typically over only about 1530 to 1560 nm.

Given two signals (an intense pump wave and a weaker probe or signal wave at a longer frequency) propagating inside a fibre such that the frequency difference between the two lies within the bandwidth of the Raman gain spectrum, the probe signal will be amplified, so an amplifier can be made. If the probe wave is absent, spontaneous Raman scattering acts as a probe wave and will be amplified. Since spontaneous Raman scattering produces photons within the entire bandwidth of the Raman gain spectrum, all frequency components are amplified, but frequency components at the gain peak $g_{Rmax}$ will build up most rapidly. For pump powers above a certain threshold value, these components build up almost exponentially such that a significant proportion of the pump energy gets converted into red-shifted radiation at a longer wavelength. This process is called stimulated Raman scattering.

The pump waves used in some embodiments of the present invention are pulsed with a pulse length of 20 ns; this corresponds to a quasi-cw regime. The walk-off length $L_w$ of these pulses as they travel in optical fibre is defined as $$L_w = T_0/|v^{-1}_{gp} - v^{-1}_{gs}| \quad (2)$$

where $T_0$ is the duration of the pump pulses for pump pulses with $T_0 \geq 1$ ns. $L_w$ normally exceeds 200 m and is greater than the length of the fibre used in the embodiments. This means that group velocity dispersion effects can be neglected, and cw theory can be used to describe the interaction between the pump and probe waves in the fibre. The change in intensity of the two waves is described by a set of coupled wave equations:

$$dI_s/dz = g_R I_p I_s - \alpha_s I_s \quad (3)$$

$$dI_p/dz = -(\omega_p/\omega_s)g_R I_p I_s - \alpha_p I_p \quad (4)$$

where the absorption coefficients $\alpha_p$ and $\alpha_s$ account for loss in the fibre at the pump and probe wavelengths. Equation (3) describes growth of the probe wave and Equation (4) describes depletion of the pump.

The Raman gain in a fibre can be described by a simple equation as follows:

$$\text{Gain (dB)} = 10 \log_{10}[\exp(g_R P L_{eff}/A_{eff})] \quad (5)$$

where $L_{eff}$ is the effective length of the fibre given by:

$$L_{eff} = 1/\alpha_p [1 - \exp(\alpha_p L)] \quad (6)$$

$A_{eff}$ is the effective area of a fibre, $\alpha$ is the loss of the fibre per km, and L is the fibre length. For the holey fibres used in the present invention, the effective area can be as small as 1 µm². This is about 50 times smaller than the effective area of a standard fibre. As the Raman gain is a strong function of the effective area, the gain expected for a given incident pump power using a holey fibre is much bigger than compared to a standard fibre. However, holey fibre can have a bigger loss than standard fibre. The loss of holey fibre used in some embodiments of the present invention is ~40 dB/km. Using equation (5) it is possible to estimate how much Raman gain can be obtained with certain fibre parameters.

Figure 4A:
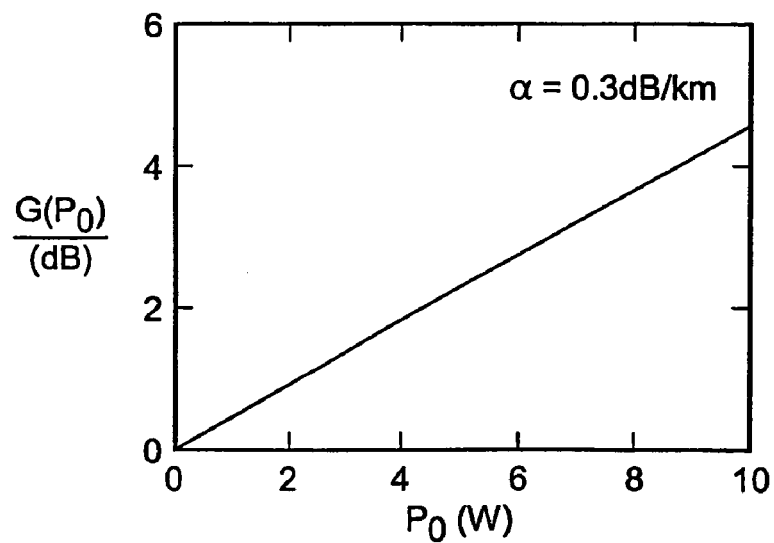
FIGS. 4(a) and 4(b) show graphs of the calculated variation of Raman gain with pump power for a standard fibre and a holey fibre respectively.
Figure 4B:
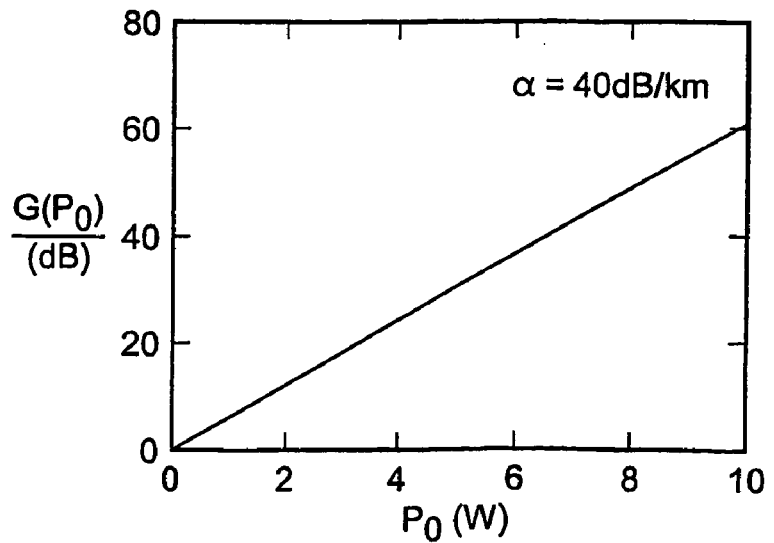

FIG. 4(a) shows a graph of calculated Raman gain G versus pump power $P_0$ for a standard fibre with L=75 m, α=0.3 dB/km and $A_{eff}$=50×10$^{-12}$ m². In contrast, FIG. 4(b) shows a graph of calculated Raman gain G versus pump power $P_0$ for a holey fibre with L=75 m, α=40 dB/km and $A_{eff}$=2.71×10$^{-12}$ m². Both of the calculations use $g^R$=7.14×10$^{-14}$ m/W, linearly extrapolated from a value given by a formula in [5]. From the Figures, it is evident that for the same fibre length and the same pump power level, the Raman gain that can be achieved using a holey fibre, for realistic pump powers of order 5 W, is approximately 20 dB larger than for a standard fibre.

The effective length plays an important role in determining Raman gain as described by Equation (5). Parameters that can change the effective length include the loss α and the fibre length L.

Figure 5A:
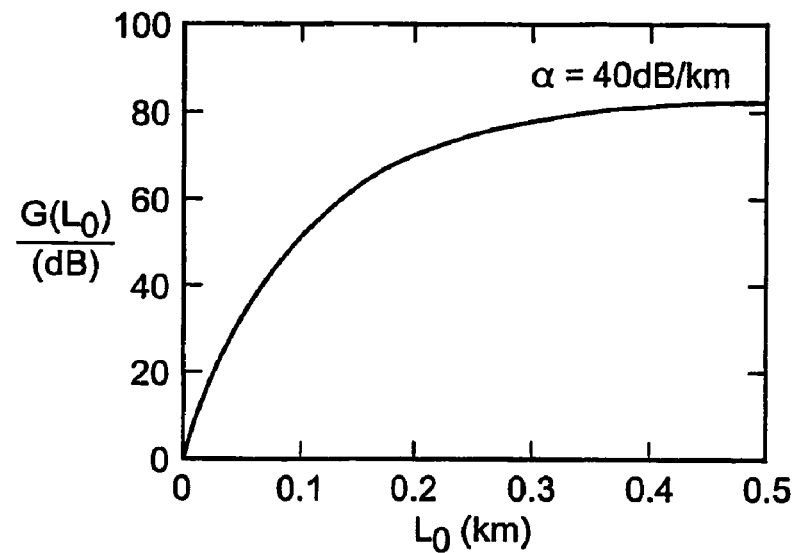
FIGS. 5(a) and 5(b) show graphs of the calculated variation of Raman gain with fibre length for different values of fibre loss.
Figure 5B:
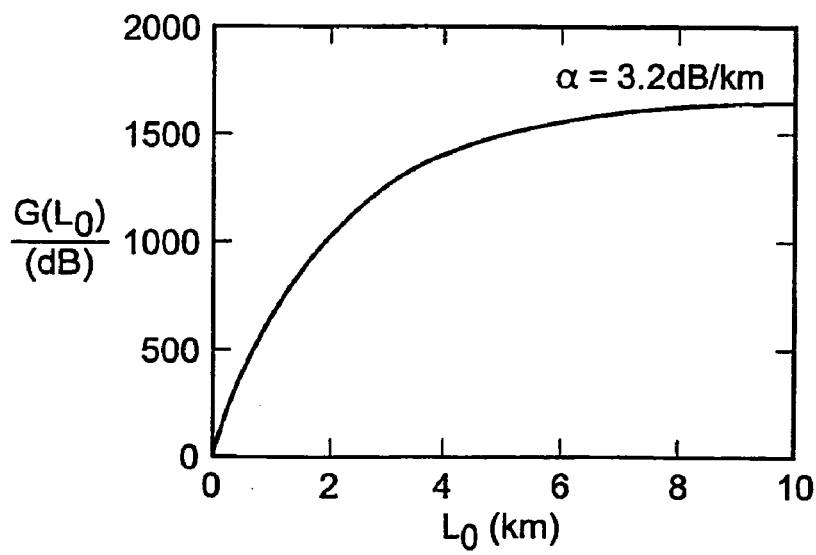

FIGS. 5(a) and 5(b) are graphs of calculated Raman gain G versus fibre length $L_0$, for holey fibre. To demonstrate how both length and loss affect the gain through the effective length, FIG. 5(a) is calculated for a loss of 40 dB/km, and FIG. 5(b) for 3.2 dB/km. From the Figures, it is evident that the gain saturates at a certain length of holey fibre. This phenomenon occurs because the loss sets a certain maximum value of effective length of the holey fibre. No matter how much the fibre length is extended, the Raman gain will not be increased beyond a certain value, as the effective length is already at its maximum value. The lower the loss of the holey fibre, the longer the maximum value of the effective length, and hence the longer the length of holey fibre that can be used to provide Raman gain. With a loss of 40 dB/km, the Raman gain looks fully saturated at L=300 m with a value of ~80 dB. However, for a loss of 3.2 dB/km, the Raman gain does not saturate until L=7 km, with a much greater value of 1500 dB (these calculations ignore the effect of gain saturation through spontaneous Raman emission which in practice limits the gains achievable to 50 to 60 dB). The calculations show that only 130 mW of pump power are needed to get a gain of ~30 dB using a holey fibre with a loss of 3.2 dB/km and a length of about 1 to 2 km. Continuous wave output lasers with this level of output power are commercially available, which means that the use of a holey fibre for a commercially viable Raman amplifier is feasible. Moreover, the lengths of fibre concerned are significantly shorter than those typically required in Raman amplifiers based on standard optical fibre.

Figure 6:
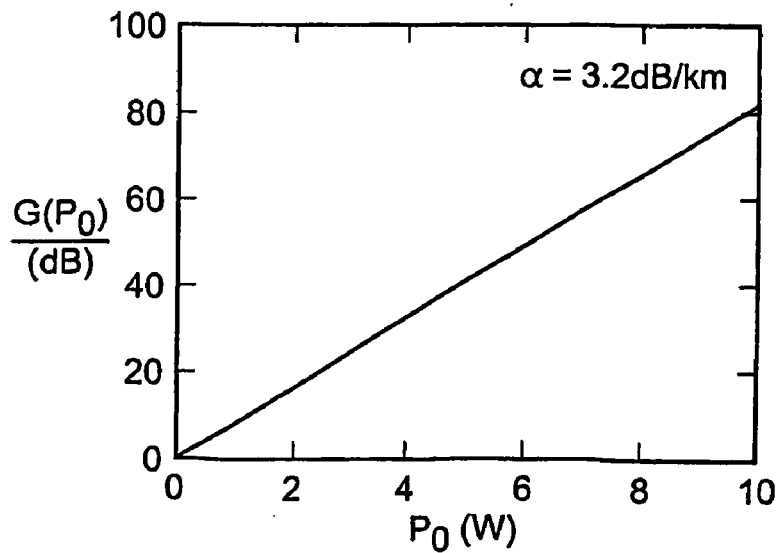
FIG. 6 shows a graph of the calculated variation of Raman gain with pump power for a holey fibre with a loss of 3.2 dB/km.

A loss value of 3.2 dB/km has been chosen for the calculations because it is the lowest value for a holey fibre reported at the time of this work [6]. FIG. 6 shows a graph of calculated Raman gain G versus pump power $P_0$ for a holey fibre with a loss of 3.2 dB/km and other parameters as used in the calculations used for FIG. 4(b). For the same pump power (6.7 W), a loss of 3.2 dB/km gives an extra ~15 dB of Raman gain compared to a loss of 40 dB/km.

In fibre Raman amplifiers, $I_p$ is normally much higher than $I_s$. Energy is transferred from the pump signal to the Stokes wavelength and hence the probe signal is amplified. As the value of the Stokes signal is increased, the pump signal begins to get depleted. When the two are comparable, energy can be transferred to the higher order Stokes line. Consequently, a strong Stokes signal at a longer wavelength can be used to deplete a relatively weak wave at a shorter wavelength. This is the principle behind optical intensity modulation based on the Raman effect. If the pump is a cw wave and the Stokes signal is pulsed, holes will be created within the cw signal that follow the shape of the Stokes pulses.

Holey Fibres

Holey fibre is a unique type of optical fibre. It can be made from a single material, unlike conventional, standard fibre which uses different core and cladding materials to provide a refractive index difference to guide light within the core. Holey fibre instead has an array of air holes running along its entire length which act as the cladding. The core is made by introducing a high index defect into the holey structure, by elimination of one or more holes. Wave guiding is achieved by means of an effective volume average refractive index difference between the defect region and the holey cladding region. The holes are often arranged in a periodic lattice, although the holes do not need to be periodically arranged or even to be of a constant size for the holey fibre to guide light.

FIG. 7(a) is a schematic cross-sectional view through a holey fibre having a core 28 surrounded by holes 30 arranged in a periodic lattice, and FIG. 7(b) is a schematic cross-sectional view through a holey fibre having a core 28 surrounded by holes 30 arranged at random and having varying sides [7].

Figure 7C:
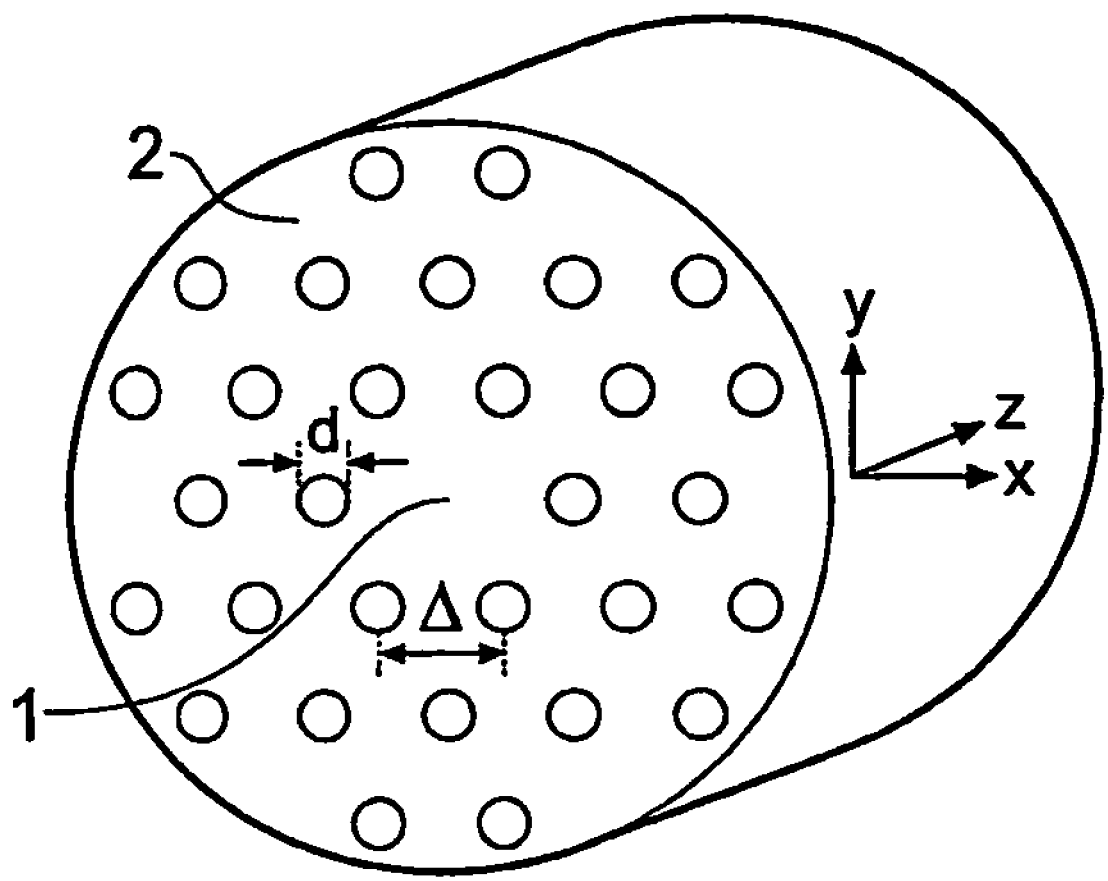

FIG. 7(c) shows a schematic diagram of a holey fibre comprising a solid core 1 and holey cladding 2. An outer jacket (not shown) may also be provided. The holes in the cladding have a diameter d and are separated by a characteristic hole-to-hole spacing Λ. The ratio of these parameters, d/Λ, can be varied to modify various properties of the fibre.

Although the guidance mechanism in holey fibres is conceptually simple, the optical properties very dramatically depending on the hole arrangement. This is because the effective refractive index difference between the core and the cladding is a strong function of the hole arrangement. It is also a strong function of wavelength, since at longer wavelengths the mode extends further into the holes, thereby reducing the effective cladding index. This results in unique and potentially useful properties for such fibres including, among others, single mode operation over broad wavelength ranges [8], large mode sizes [9] and unusual dispersion characteristics [10].

However, a key property of holey fibres as regards the present invention is that they can have an optical nonlinearity about 10 to 100 times higher than a conventional silica fibre. The increased nonlinearity means that a much shorter length of holey fibre is required to achieve an equivalent degree of Raman amplification compared to a conventional fibre. It is preferred that the effective nonlinearity is in excess of 20 W$^{-1}$km$^{-1}$, as this gives a useful amount of stimulated Raman scattering in an advantageously short fibre length. However, smaller values of effective nonlinearity can also be used. The nonlinearity can be altered by varying the d/Λ ratio. For example, to achieve a value of more than 20 W$^{-1}$km$^{-1}$, d/Λ may be >0.6, with Λ<2 µm, <3 µm or <4 µm. Thus, a fibre device utilising the Raman effect and based on holey fibre can be made substantially more compact and less costly than known devices. Also, a shorter length means that the device can tolerate a higher degree of loss without detriment to overall performance. Other advantages arise from the fact that holey fibre can be made from a single material; a Raman amplifier made from a pure silica holey fibre is expected to have a higher power handling capability than one using a standard fibre made from two materials. Other pure materials could be used instead, which allows the power capability to be tailored as required. Alternatively, doped materials can be used. The refractive index of the fibre material can be altered by doping, to give refractive index values greater than that of pure silica. Furthermore, doping can be confined to the core region of the holey fibre. For example, a germanium doping can increase the nonlinearity of the core, which gives a higher gain and hence a strategic advantage for the fundamental mode of the fibre, giving improved single mode operation in the instance that the core, or indeed the holey fibre structure, i.e. the cladding region, is a multimode waveguide.

FIG. 8 is a graph showing a comparison of the measured nonlinear phase shift versus input power for a holey fibre 32 and a standard dispersion shifted fibre 34 [11]. The holey fibre is significantly more nonlinear than the dispersion shifted fibre, reflecting the fact that the holey fibre has a much smaller mode area. The holey fibre used in embodiments of the present invention is much more nonlinear than the holey fibre represented in FIG. 8, as the core size is a factor of ~5 times smaller.

The effective mode area $A_{eff}$ of a holey fibre can be tailored by changing the inter-hole spacing. It has been reported that it is possible to tune $A_{eff}$ over three orders of magnitude, from ~1 to >1000 µm² at a wavelength of 1.5 µm, thus also tuning the nonlinearity of the holey fibre by three orders of magnitude [7]. Therefore, the nonlinearity can be closely tailored to the requirements of a particular Raman effect application.

For the purposes of implementing embodiments of the present invention, a holey fibre having a high nonlinearity and good polarisation maintaining properties (to maximise the efficiency of the nonlinear interaction) was designed. The holey fibre structure has large air holes and a considerable structural asymmetry to provide the high birefringence required to ensure good polarisation maintaining operation. The core diameter is ~1.6 µm, and the outer diameter is ~100 µm. Lengths of 75 m of this fibre were used in embodiments described herein. The loss of the fibre was measured using the cut-back technique to be ~40 dB/km, thus giving an effective length of 54 m.

FIG. 9 shows a scanning electron micrograph of a cross-section of the fibre.

Figure 10:
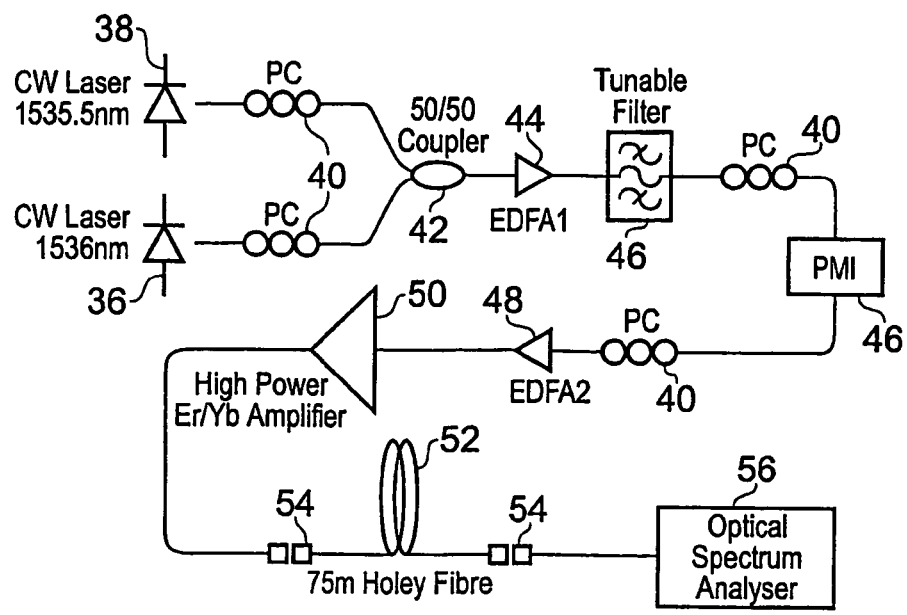
FIG. 10 shows a schematic diagram of equipment used to measure the nonlinear phase shift of the holey fibre of FIG. 9.

FIG. 10 shows a schematic diagram of an experimental set-up used to measure the nonlinear coefficient γ of the holey fibre at 1536 nm using a direct cw beat-signal measurement of nonlinear phase shift. A 1536 nm cw laser beam from a semiconductor laser 36 and a 1535 nm cw laser beam from a tunable semiconductor laser 38 were each passed through polarisation controllers 40 before being combined using a 50/50 coupler 42 and amplified using an first erbium-doped fibre amplifier 44 (EDFA1) as a preamplifier. A tunable bandpass filter 46 was used to remove background amplified spontaneous emission (ASE) noise produced by the EDFA1 44. The light was then passed through a further polarisation controller 40, a polarisation maintaining isolator 48 and a second further polarisation controller 40, to ensure that the light was linearly polarised. Then, a combination of a further EDFA 48 (EDFA2) and an erbium/ytterbium-doped high power fibre amplifier 50 were used to amplify the light further before it was launched into a 75 m length of the holey fibre 52, via a translation stage and lens 54. The resulting output signal was then observed using an optical spectrum analyser 56.

Figure 11:
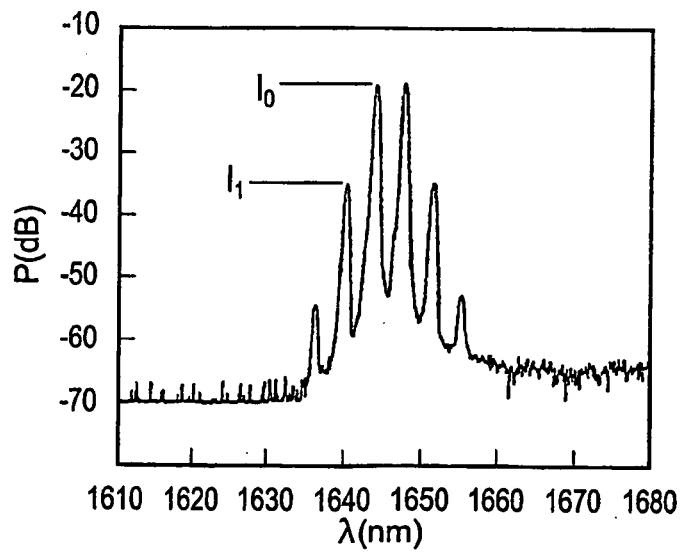
FIG. 11 shows a measured spectrum of nonlinear mixing in the holey fibre of FIG. 9, used to calculate the effective nonlinearity.

FIG. 11 shows the observed signal as a function of output power P with wavelength λ. From this is can be seen that the fibre nonlinearity creates spectral sidebands. The intensity ratio between the main signal $I_0$ and the first sideband $I_1$ gives the nonlinear phase shift through the equation:

$$I_0/I_1 = (J_0^2(\phi_{SPM}/2) + J_1^2(\phi_{SPM}/2))/(J_1^2(\phi_{SPM}/2) + J_2^2(\phi_{SPM}/2)) \quad (7)$$

where $I_{0,1}$ are the peak intensities of the signal and first sidebands respectively and $J_n$ is the nth Bessel function. $\phi_{SPM}$ is the nonlinear phase shit given by $$\phi_{SPM} = (2\omega_0/c)\gamma L_{eff} P \quad (8)$$

where $L_{eff}$ is the effective fibre length and P is the signal power. From $\phi_{SPM}$, it is possible to calculate the effective nonlinearity γ of the fibre. The effective area of the fibre $A_{eff}$ can then be estimated from $$\gamma = n_2/A_{eff} \quad (9)$$

where $n_2$ depends on the material composition of the fibre. For a pure silica fibre as used in the embodiments, $n_2$ has a standard known value of $2.16 \times 10^{-20}$ m²/W.

Figure 12:
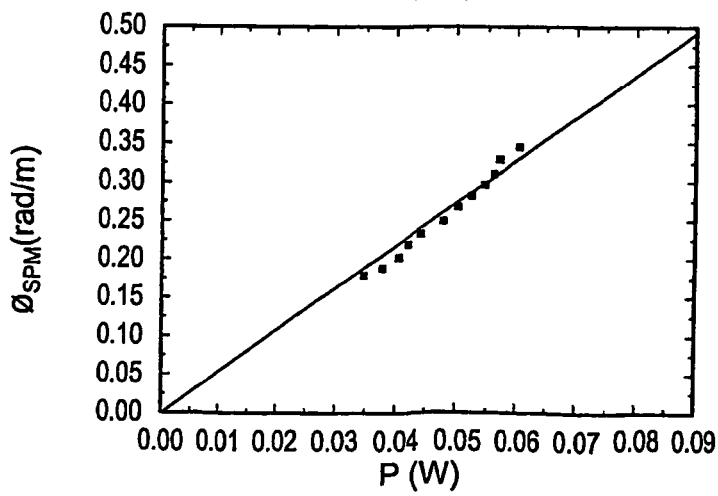
FIG. 12 shows a graph of measured nonlinear phase shift against pump power for the holey fibre of FIG. 9.

FIG. 12 shows a graph of the measured nonlinear phase shift $\phi_{SPM}$ versus launched optical power P. The slope of the line fitted to the measured data points gives the nonlinearity through Equation (8). A value of γ=0.032 W⁻¹m⁻¹ was obtained in this way, and an estimate of $A_{eff}$ 2.85 (±0.3) µm² made using Equation (9). This latter value shows good agreement with a theoretical prediction of 2.71 µm² based on structural data from the micrograph shown in FIG. 9.

First Embodiment—Raman Amplifier

FIG. 12 shows a schematic diagram of an experimental setup used to implement a Raman amplifier using holey fibre in accordance with a first embodiment of the present invention. A co-propagation scheme of pump and signal was adopted (in which the pump wave and the signal, or probe, wave are launched into the same end of the holey fibre) so as to avoid difficulties of having to maximise the launching of light into the holey fibre at both of its ends.

A pump optical source 58 is used to provide pump light. The pump optical source 58 is a quasi-cw pulsed source capable of generating 20 ns square pulses of 500 kHz, by use of an associated time synthesiser 60 to modulate the output of a semiconductor laser. This arrangement gives watts of peak power, which is sufficient to obtain an appreciable level of gain. The use of such short pulses, having a 500 ps rise time, broadens the spectral bandwidth of the pump pulses, which helps to minimise the unwanted effect of stimulated Brillouin scattering in the holey fibre, which can increase the effective losses for the pump radiation in the system. The pump light has a wavelength of 1535 nm, which, with a silica holey fibre, gives amplification in the long (L) band amplifier region (1590 nm to 1610 nm).

The modulated pump light from the pump optical source 58 is then pre-amplified using a first erbium-doped fibre amplifier 62 (EDFA1), and passed through a tunable bandpass filter 64 to remove any background amplified spontaneous emission (ASE) noise. A polarisation maintaining (PM) isolator 66 with an input polarisation controller (PC) 68 is then used to ensure that the pump light is linearly polarised. Another polarisation controller 70 is located after the PM isolator 66 to ensure that light can be coupled onto a principle axes of a length of holey fibre used for Raman amplification. The linearly polarised pump light is subsequently amplified through a second erbium-doped fibre amplifier 72 (EDFA2) and a high power erbium/ytterbium-doped fibre amplifier 74. The second EDFA 72 is used to obtain a sufficient power level to saturate the high power amplifier 74, so as to obtain a maximum amount of pump power.

A signal optical source 76, in the form of a cw semiconductor laser tunable from 1600 nm to 1640 nm is used to provide signal or probe light at the Stokes wavelength. A polarisation controller 78 is used to ensure linear polarisation of the signal light. In this case, tunability of the signal light allowed the Raman amplifier to be tested across the Raman gain bandwidth. In a commercial device for use in a telecommunications network, however, the signal light will be at a particular carrier wavelength, or in the case of a multiplexed system, at several wavelengths within the gain bandwidth.

The amplified pump light from the high power amplifier 74 and the signal light from the signal optical source 76 are combined together using a 1535/1630 nm wavelength division multiplexer (WDM) coupler 80, and then coupled into a 75 m length of pure silica polarisation-maintaining holey fibre 82 using translation stages and lenses 84. The lenses have focal lengths of 15 mm and 2.75 mm to obtain a good coupling efficiency into the holey fibre 82. Further lens 86 are used to couple light exiting the holey fibre 82 into an acousto-optic tunable filter 88 (AOTF) located at the output of the holey fibre, and used to filter out the pump light, to enable the amplified signal to be studied. In a commercial device, similar filtering is typically required to remove pump light from the telecommunications signal. A radio frequency (RF) synthesiser 90 and an RF amplifier 92 generate an tunable RF signal which tunes the central wavelength of the filter window of the AOTF 88. The central wavelength of the filter window can be tuned by changing the frequency of the RF input signal of the AOTF. The filtered light from the AOTF is split into two halves using a 50/50 coupler 94. For the purposes of the studying the amplifier output, one half of the light is fed to an optical spectrum analyser 96 and the other half to a photoreceiver 98 connected to an oscilloscope 100.

In operation, the pump light produces Raman gain in the holey fibre, owing to the nonlinearity of the fibre material, and the gain amplifies the incoming signal light, in the manner described above in the Theoretical Background section. The high nonlinearity of the holey fibre allows appreciable gain to be achieved with relatively short lengths of holey fibre, such as the 75 m length used in this embodiment.

Figure 13:
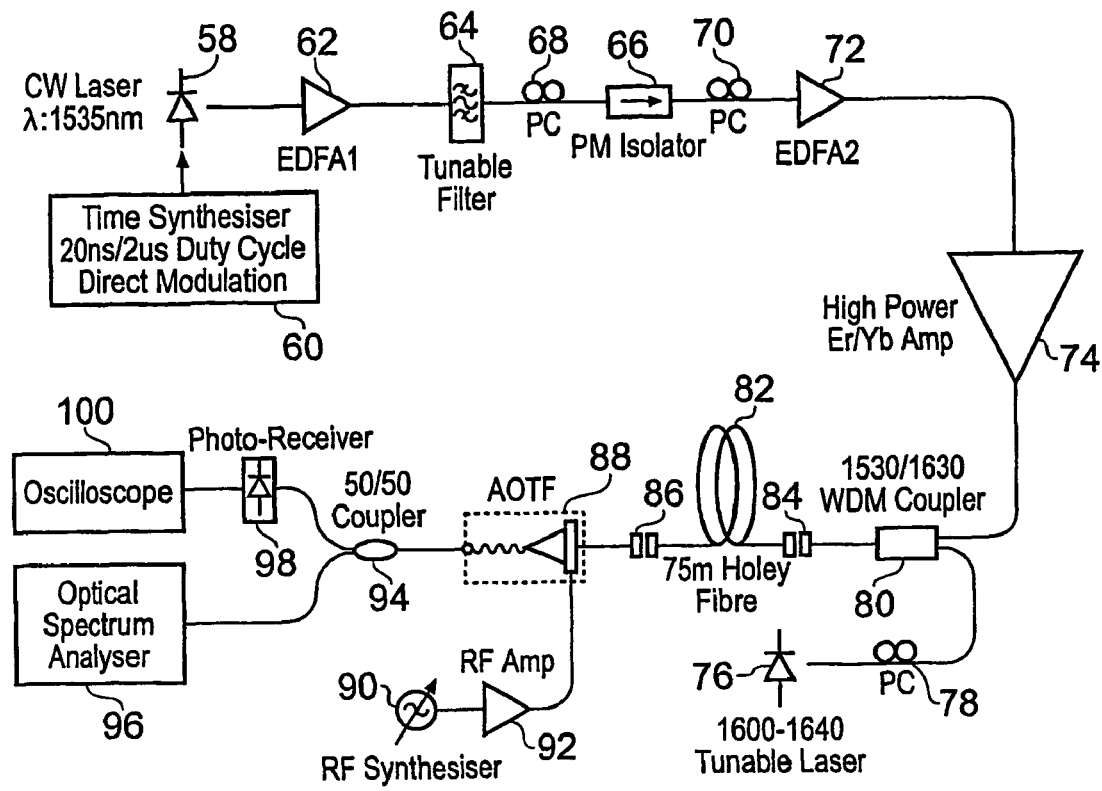
FIG. 13 shows a schematic diagram of a Raman amplifier according to a first embodiment of the invention.

The operation of the Raman amplifier shown in FIG. 13 has been extensively characterised. The shape of the 20 ns pump pulses was recorded using a combination of a fast time response photo-detector and a digital oscilloscope, to obtain information as to how much of the recorded average power was background ASE from the non-Raman amplifiers. It is important to take into account this background noise when calculating the peak power of the amplified signal wave, as the total background noise can be significant, especially with a low duty cycle of pulses, in this case 1%. It was found experimentally that the background noise contributed almost half of the total average power recorded. The average pump power out of the high power amplifier 74 was measured using a thermal power meter. The peak power was then calculated using the following formula:

$$P_{pk} = P_{avg}/D_t \times E_p/(E_p + E_n) \quad (10)$$

where $P_{pk}$ is the peak power, $P_{avg}$ is the measured average power, $D_t$ is the duty cycle of the pulses, $E_p$ is the energy in a pulse and $E_n$ is the total noise energy within the pump pulse period. The maximum pump peak power that could be achieved through the arrangement of FIG. 13 was ~22 W.

Using the lens 84 it is possible to achieve coupling efficiencies of the pump and signal light into the holey fibre 82 as high ~50%. Alternative lens having different focal lengths give a coupling efficiency of ~30%, via a less sensitive alignment arrangement. The coupling efficiency was measured using a combination of a photo-detector and a digital oscilloscope. A chopper was located before the photo-detector to distinguish the light intensity and the zero level. The coupling efficiency is given by:

$$\eta_c = (i_1/i_0)\exp(\alpha L) \quad (11)$$

where $\eta_c$ is the coupling efficiency, $i_1$ is the intensity of light out of the holey fibre 82, $i_0$ is the intensity of the light incident on the holey fibre 82, $\alpha$ is the loss of the holey fibre 82 and L is the holey fibre length.

As pulsed pump light is used instead of cw pump light, the signal light will be amplified only when a pump pulse is present in the holey fibre. The amplified signal output will hence follow the shape of the pump pulses. The peak power level from the spectrum (average power) of the whole signal output was measured, and the actual peak signal power calculated Equation (10). To support this measurement, measurements were also made of the signal gain in the time domain using a combination of a digital oscilloscope and a high sensitivity, fast time response photo-receiver. The intensity level of the signal output after the AOTF 88 was measured when the pump signal was on and when the pump signal was off. The signal gain is defined as $$\text{Gain (dB)} = 10 \log_{10}(P_{out}/P_{in}) \quad (12)$$

where $P_{out}$ is the output signal power and $P_{in}$ is the input signal power. From the on-off ratio measured, the internal gain in the holey fibre 82 can be calculated using the formula $$\text{Gain (dB)} = 10 \log_{10}((P_{on}/P_{off}) - \alpha_s L) \quad (13)$$

where $P_{on}$ is the output signal power when the pump is on, $P_{off}$ is the output signal power when the pump is off and $\alpha_s L$ accounts for the loss experienced by the input signal along the holey fibre 82.

To characterised the amplifier performance, the noise figure (NF) was measured. From a spectrum of the amplified signal output, the NF is estimated using:

$$NF = 2n_{sp}((G-1)/G) + 1/G \approx 2n_{sp} \quad (14)$$

where $n_{sp}$ is the spontaneous emission factor defined by $$n_{sp} = P_{ASE}/(h\nu \Delta \nu (G-1)) \quad (15)$$

where $P_{ASE}$ is the ASE power in one polarisation mode within the bandwidth $\Delta\nu$, $h\nu$ is the photon energy and G is the gain achieved.

Figure 14:
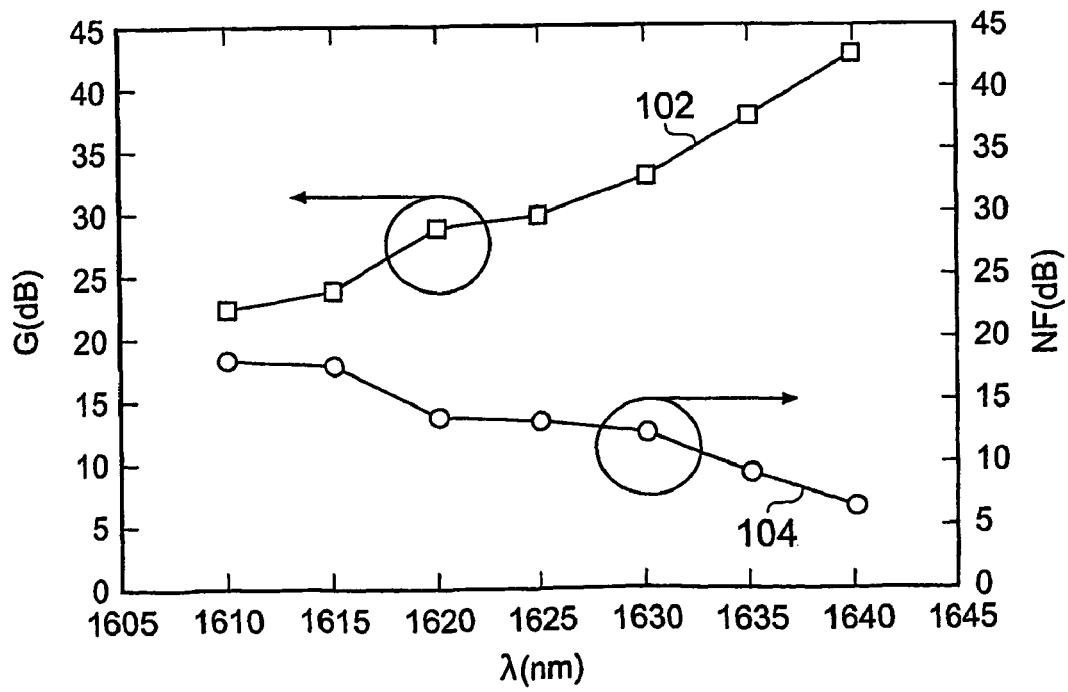
FIG. 14 shows a graph of measured internal gain and noise figure against signal wavelength for the amplifier of FIG. 13.

FIG. 14 shows a graph of measured internal Raman gain 102 and noise figure (NF) 104 at various signal wavelengths $\lambda$. The actual signal power for each signal wavelength was adjusted to be ~−10 dBm (small signal) at the input end of the holey fibre 82, and the launched pump peak power was 6.7 W. Gains as large as 42.8 dB were observed at 1640 nm with 6 dB NF.

Figure 15:
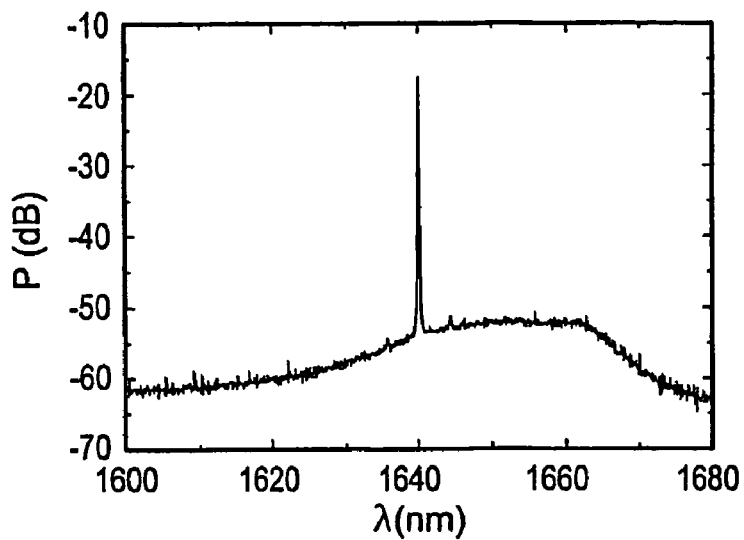
FIG. 15 shows a measured spectrum of the amplified signal from the amplifier of FIG. 13.

FIG. 15 shows the measured optical spectrum of the amplified signal, shown as signal output power P as a function of wavelength λ. The amplified signal appears with a background of ASE due to the pump light. From this spectrum, the maximum signal power, and hence the Raman gain peak, was found to be at 1647 nm, which has a 13.2 THz frequency separation from the pump wavelength of 1535 nm. This is the value expected from the Stokes shift in a pure silica fibre. The peak wavelength corresponds to higher gains and lower NFs, as shown in FIG. 14. This is to be expected as the signal wavelength approaches the optimum frequency separation. The variation of gain with wavelength as shown in FIG. 14 is as expected from the known Raman line shape for silica.

Figure 16:
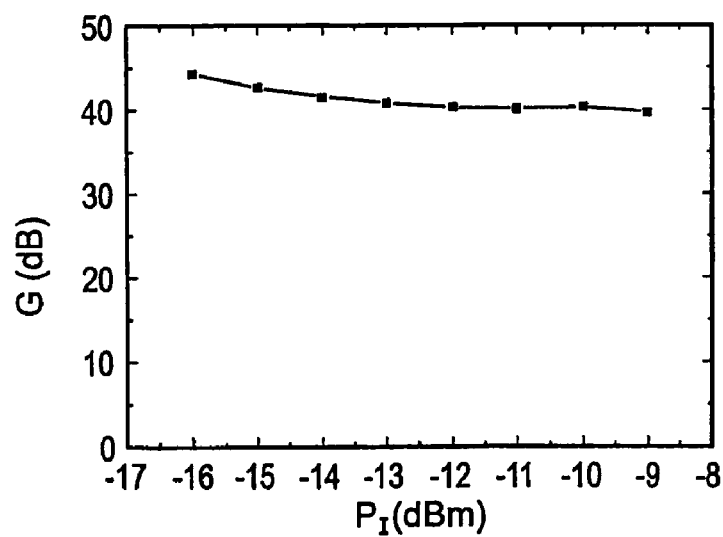
FIG. 16 shows a graph of the measured variation of internal gain with input signal power for the amplifier of FIG. 13.

FIG. 16 shows the variation of the internal gain G of the Raman amplifier with various input signal powers $P_I$. The internal gain is almost flat across the range of input powers investigated, which shows that the amplifier was operating far from the saturation region.

Figure 17:
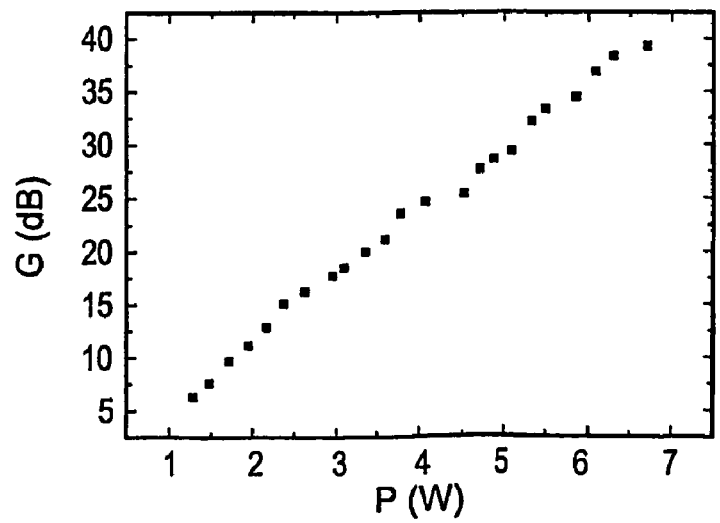
FIG. 17 shows a graph of the measured variation of internal gain with pump power for the amplifier of FIG. 13.

FIG. 17 shows the variation of the internal gain G of the Raman amplifier with pump peak power P for a signal wavelength of 1635 nm. There is a linear increase of gain with pump peak power. This shows good agreement with the calculated values of gain shown in FIG. 4(b). From this information on the gain, the peak Raman gain coefficient $g_{Rmax}$ was estimated using Equation (5), with a linear extrapolation to the peak of the measured gain curve. The extrapolated $g_{Rmax}$ value is $7.66 \times 10^{-14}$ m/W, which approximates well to the value of $g_{Rmax}$ for pure silica estimated using a formula reported elsewhere [5]:

$$g_{Rmax}(SiO_2)=1.2\times10^{-11}/\lambda(cm/W) \quad (16)$$

where the pump wavelength λ is measures in μm. Substituting the pump wavelength value of 1.535 μm into Equation (16) gives $g_{Rmax}=7.8\times10^{-14}$ m/W.

Second Embodiment—Optical Modulator

As discussed in the Theoretical Background section, the Raman effect can provide optical loss, as well as optical gain [3, 12]. This can be used to modulate an optical signal, whereby the pattern of a modulated pump wave is imprinted "negatively" onto a cw signal wave at a shorter wavelength and weaker power; "holes" are effectively made in the signal wave by the loss induced by the pump wave. Using holey fibre as the Raman medium in such a device confers the same benefits as are obtained by using a holey fibre in a Raman amplifier, such as a much reduced fibre length to produce a similar effect compared to a device based on standard fibre.

Figure 18:
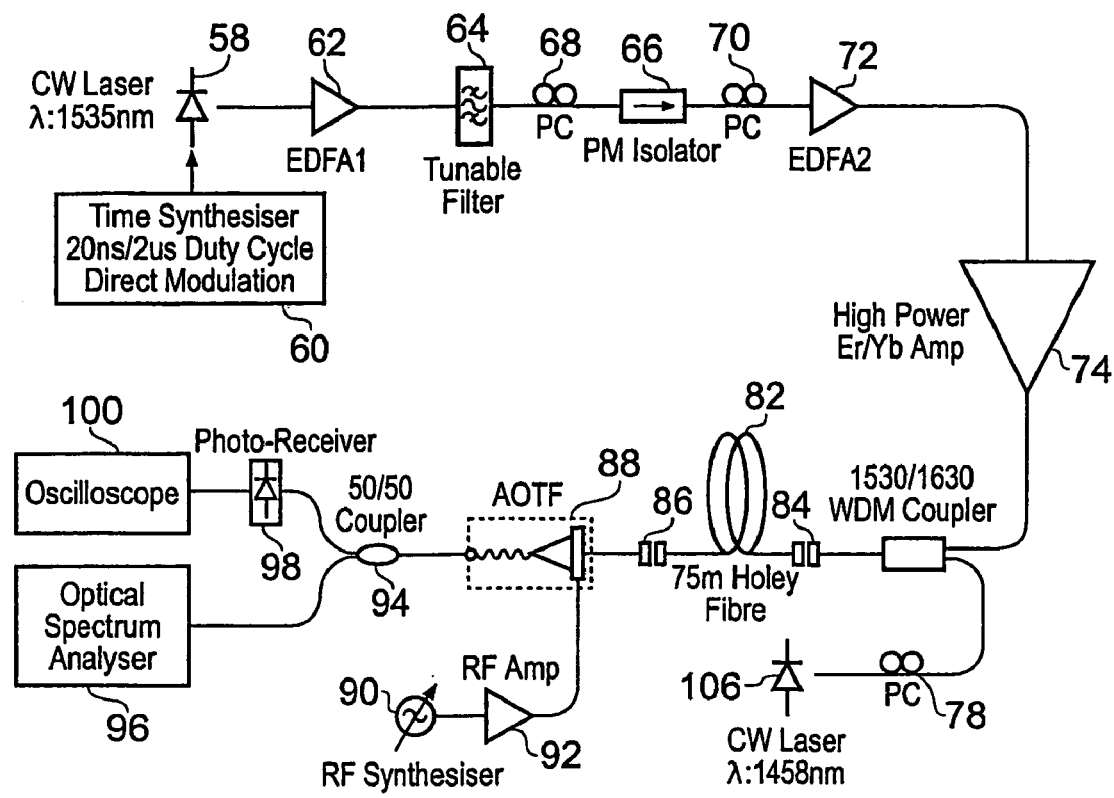
FIG. 18 shows a schematic diagram of an optical modulator according to a second embodiment of the invention.

FIG. 18 shows a schematic diagram of an experimental arrangement used to provide an optical modulator based on the Raman effect in a holey fibre according to a second embodiment of the invention. The components are the same as those used for the Raman amplifier described in the first embodiment, with reference to FIG. 13, except that the signal optical source 76 operating at 1600 to 1640 nm is replaced with a non-tunable signal optical source operating at 1456 nm, in the form of a cw semiconductor diode laser with 20 dBm output power. The signal wavelength is thus shorter than the pump wavelength of 1535 nm. As before, the pump power level is higher than the signal power level.

The effect of this alteration is that, via the Raman effect, the high power pump wave produces optical loss at a shorter wavelength, whereas in the amplifier the high power pump wave produces optical gain at a longer wavelength. Thus, in both cases, the power level of a wave at a short wavelength is reduced relative to the power level of a wave at a longer wavelength. In amplification, this occurs by an increase in the power level of the longer wavelength, while in modulation, there is a decrease in the power level of the shorter wavelength.

Alternatively, the 1456 nm optical source in the modulator can be thought of as a weak pump, whereas the 1535 nm pulses from the pump optical source now act as a to strong Stokes signal.

The same 1535/1630 nm WDM coupler used in the amplifier is here used to couple the two waves into the holey fibre 82, as it can also act as a 1456/1535 nm WDM coupler due to a periodic wavelength dependence of its transmission characteristics. When characterising the system, the RF input signal to the AOTF 88 was tuned to pass the 1456 nm signal light and to filter out the 1535 nm pump light. The frequency separation of the pump pulses and the cw signal is 10.5 THz, which falls within the expected optical loss curve, so that the Raman modulation effect can be observed.

Measurements of the extinction ratio of the output signal, that is, how much the signal is reduced by the loss induced by the pump, were made using a combination of a photo-detector and a digital oscilloscope.

When both pump pulses of longer wavelength and the cw signal wave at the shorter wavelength are launched together into the holey fibre 82, temporal square-shaped holes in the output signal are observed. The holes follow the shape of the pump pulses, as can be seen by following the two waves on oscilloscopes.

Figure 19:
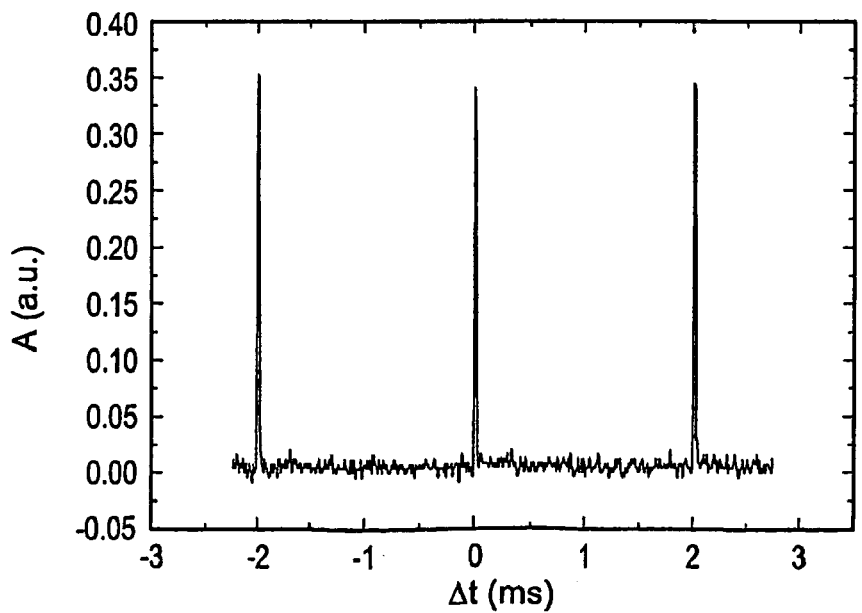
FIG. 19 shows a graph of the measured amplitude of pump pulses used in the optical modulator of FIG. 18.

FIG. 19 shows a measurement of the pump pulses, as amplitude A against time delay Δt. The pulse separation of 2 ms can be seen.

Figure 20:
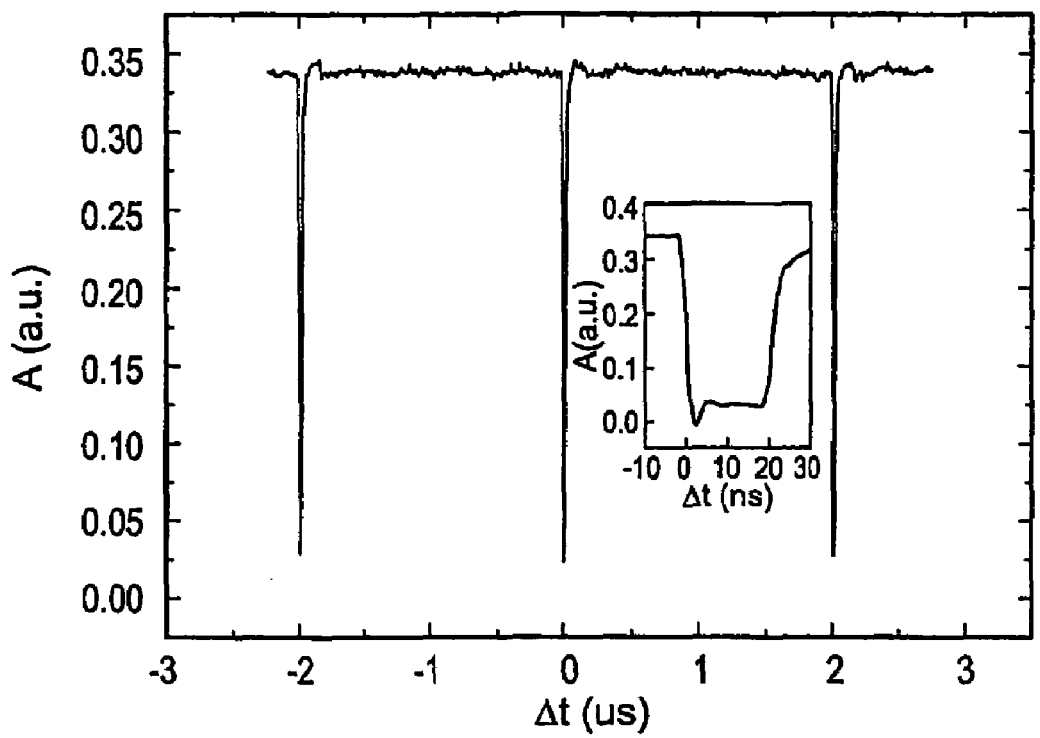
FIG. 20 shows graphs of the measured amplitude of the modulated signal from the optical modulator of FIG. 18.

FIG. 20 shows a corresponding measurement of the signal wave after passing through the modulator, as amplitude A against time delay Δt. The modulations in the signal wave amplitude follow the pump pulses, with a 2 ms separation. The inset shows a single depleted hole in more detail, illustrating how the duration of the hole is 20 ns, matching the 20 ns duration of the pump pulses. The temporal dip in the falling edge of the hole is an artefact caused by ringing of the photo-receiver used to make the measurement.

To evaluate the performance of this intensity modulation process, measurements were made of the extinction ratio (amount of depletion) of the square-shaped holes, by measuring the depth of the holes relative to the signal output cw power level.

Figure 21:
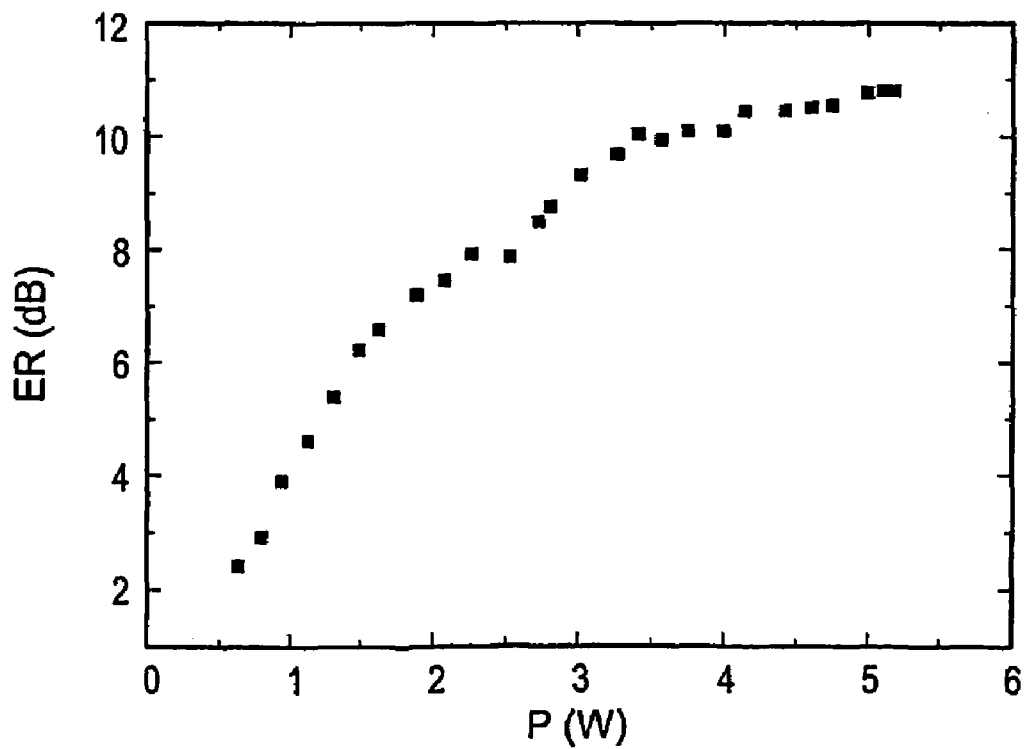
FIG. 21 shows a graph of the measured variation of extinction ratio with pump power for the optical modulator FIG. 18.

FIG. 21 shows a graph of the resulting measurements, showing the variation of the extinction ratio ER with respect to the peak pump power P at 1535 nm. A maximum extinction ratio of 11 dB was observed. Higher values of extinction ratio are expected to be obtainable by tuning the frequency separation of the pump and signal closer to the peak Raman shift value (the anti-Stokes shift shown in FIG. 2), and by optimising the alignment of the polarisation of the two pump and signal waves relative to the principle axes of the holey fibre, because the alignment affects the efficiency of the nonlinear process.

Further, to provide a more practical Raman intensity modulator, shorter pulses (typically of a few picoseconds duration) should be used in preference to longer pulses such as the 20 ns pulses demonstrated. This will create picosecond-long erasure windows in the cw signal wave, to give a high bit rate to the modulation.

Third Embodiment—Raman Laser

The benefits of using a holey fibre as a Raman medium can be further exploited by using holey fibre as the gain medium in a Raman laser. In a Raman laser, the gain derives from stimulated Raman scattering, as described above with respect to the Raman amplifier, and the output signal at the Stokes wavelength derives initially from the first scattering events producing photons at the Stokes wavelength. It is further increased by the provision of optical feedback to provide multiple passes through the Raman gain medium so that the Stokes wave experiences the Raman gain, is amplified, and lases. Thus, as for conventional fibre amplifiers and lasers, a Raman fibre laser differs from a Raman fibre amplifier by including a feedback arrangement and not having an optical source at the output wavelength.

Figure 22A:
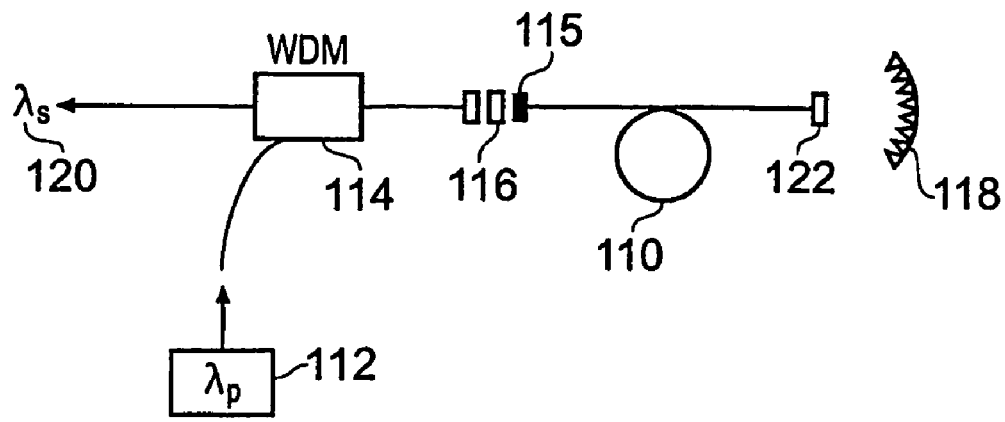
FIGS. 22(a), 22(b), 22(c) and 22(d) show schematic diagrams of examples of Raman lasers according to a third embodiment of the present invention.

FIG. 22(a) shows a possible configuration for a Raman fibre laser based on a holey fibre. The laser is arranged as a bulk device in a Fabry-Perot configuration. A pump source 112 provides pump light at a suitable wavelength, which is coupled into a length of holey fibre 110 via a WDM coupler 114 and a lens arrangement 116. Alternatively a fusion splice may be used to couple the holey fibre 110 to the WDM output fibre. A mirror or grating 118 with a high reflectivity characteristic at the Stokes wavelength is arranged at the far end of the holey fibre 110. Together with Fresnel reflection at the other fibre end 115, the mirror or grating 118 provides optical feedback at the Stokes wavelength, so that light at this wavelength undergoes multiple passes through the fibre 110. In operation, the incoming pump light is scattered to the longer Stokes wavelength within the holey fibre 110. The initially scattered light experiences some Raman amplification from further scattering of the pump light, and exits the holey fibre 110. It is reflected from the mirror or grating 118 and coupled back into the holey fibre 110 (via a lens or splicing 122), and passes back along the holey fibre. Fresnel reflection of the light then occurs at the fibre end 115. Hence the light experiences further gain and is amplified, until laser action is achieved. The Fresnel reflection is only partial, so that some of the light reaches the WDM coupler 114, and is coupled out of the laser as the signal output 120, while the remainder experiences further gain in the fibre.

Figure 22B:
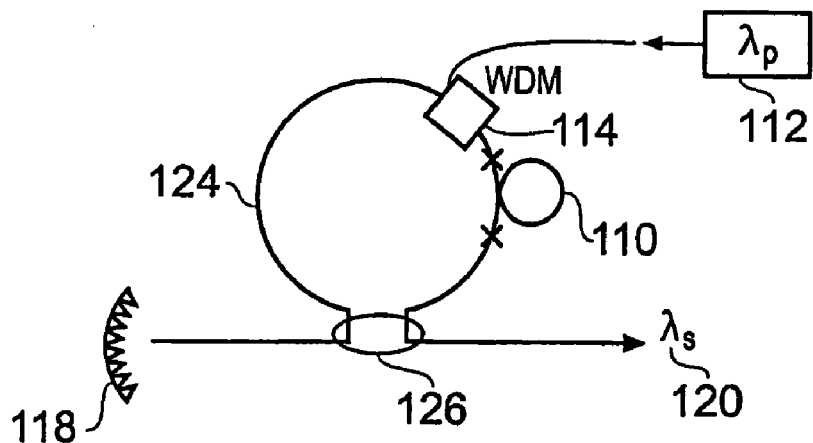

FIG. 22(b) shows an alternative arrangement, in which the holey fibre Raman laser is arranged as a ring laser. The holey fibre 110 is situated within a fibre ring 124, into which pump light from a pump source 112 is coupled via a WDM coupler 114. A mirror or grating 118 provides back reflection of the Stokes light so that it experiences multiple passes around the ring and through the holey fibre, for amplification and lasing, before being coupled out as the laser output 120. A 1:1-n coupler 126 is provided for coupling the Stokes light into and out of the ring, for reflection and output.

Figure 22C:
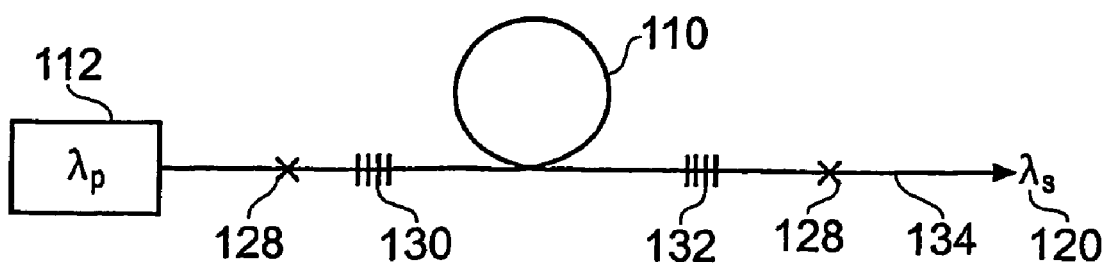

FIG. 22(c) shows a third arrangement of a holey fibre Raman laser, which uses fibre gratings written into each end of the holey fibre to provide the necessary feedback for the Stokes wave. A pump source 112 provides pump light, which is coupled into the holey fibre 110 via a fusion splice 128 (or alternatively a lens or lenses). A first fibre grating 130 in the holey fibre has high transmission at the pump wavelength, to allow the pump light into the holey fibre, and high reflectivity at the Stokes wavelength. A second fibre grating 132 at the far end of the holey fibre 110 has partial reflectivity at the Stokes wavelength, say 95%. Thus, light at the Stokes wavelength is generated in the holey fibre 110 via SRS, and experiences amplification and lasing during multiple passes through the fibre caused by reflection at the fibre gratings 130 and 132. A small amount of the light is coupled out through the partially reflecting second fibre grating 132, and delivered as the laser output 120 via an output fibre 134 spliced onto the holey fibre.

Figure 22D:
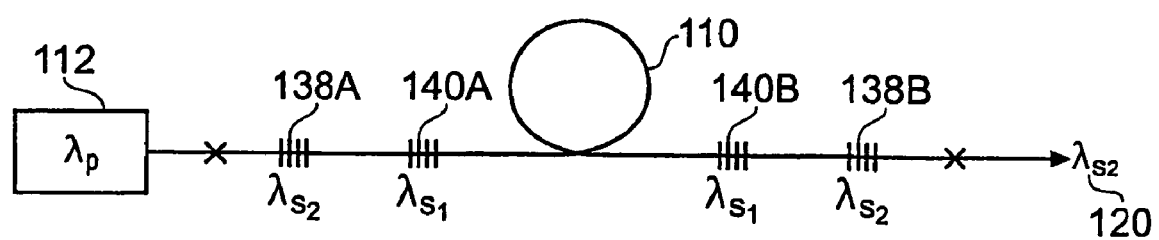

FIG. 22(d) shows an alternative embodiment of a holey fibre Raman laser utilising fibre gratings written into the holey fibre, which can generate an output at an alternative wavelength. This embodiment differs from that of FIG. 22(c) in that it comprises a ether pair of gratings in the holey fibre 110. The initial Stokes light at $\lambda_{s1}$ is generated in the holey fibre and reflected from a first pair of gratings 140 to experience amplification and lasing. However, this light itself experiences flirter SRS in the holey fibre 110, so that light at a still longer wavelength $\lambda_{s2}$ is generated. A second pair of gratings 138 provide feedback at this wavelength so that the light is amplified and lases to form the final output of the laser 120. Alternatively, further pairs of gratings may be provided to give feedback at further longer wavelengths, so that the final output can be extended by cascading of the Raman effect.

Further Embodiments

Non-Polarisation Maintaining Fibre

The above-described first and second embodiments use polarisation-maintaining holey fibre. This is optical fibre which preserves the polarisation of light launched into it, if the light is suitably polarised. This is a useful feature, because if the pump and signal waves are polarised parallel to each other, a maximum amount of Raman gain can be achieved. Consequently, if these polarisations can be maintained throughout the length of the fibre, the optical process can be optimised all along the fibre, giving a larger amplification or depletion.

However, in an alternative embodiment, a non-polarisation maintaining fibre may be used. If the pump and signal waves are polarised at random, the Raman gain achievable is half of the maximum possible. If this is deemed adequate, the requirement for ensuring that the launched pump and signal waves are suitably polarised before entering the fibre is removed. While the efficiency of the amplification is thereby reduced, a higher level of coupling efficiency into the fibre may be possible, and the device is simplified because no polarising elements are needed. This can be advantageous if, for example, the amplifier or modulator forms part of a complex telecommunications network.

Figure 23:
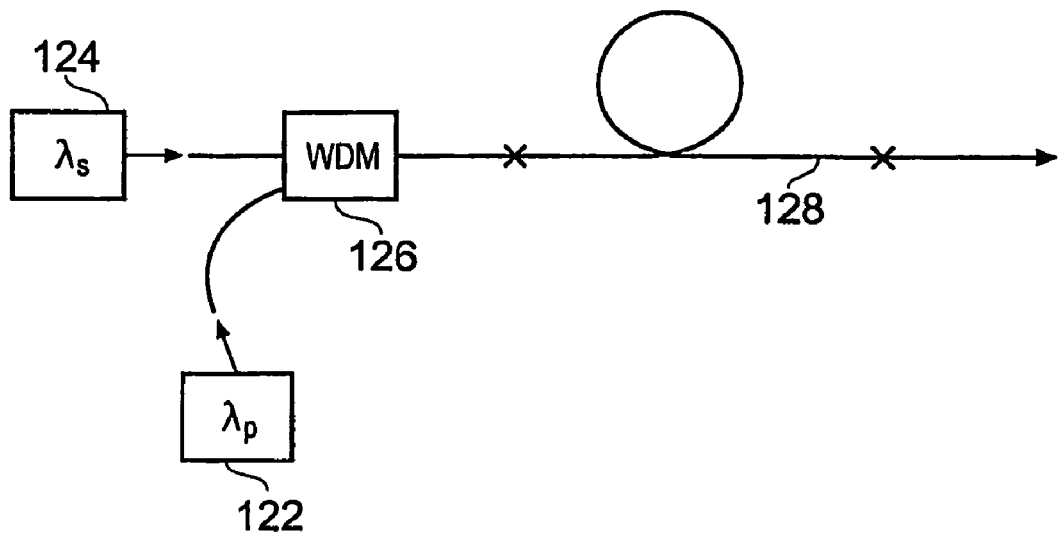
FIG. 23 shows a simplified schematic diagram of a Raman amplifier according to a further embodiment of the invention, comprising non-polarisation maintaining holey fibre.

FIG. 23 shows a simplified schematic diagram of an amplifier using non-polarisation maintaining holey fibre. Optical sources of pump light 122 and signal light 124 are coupled into a length of non-polarisation maintaining holey fibre 128 via a WDM coupler 126.

Large Area Core Fibre

Figure 24:
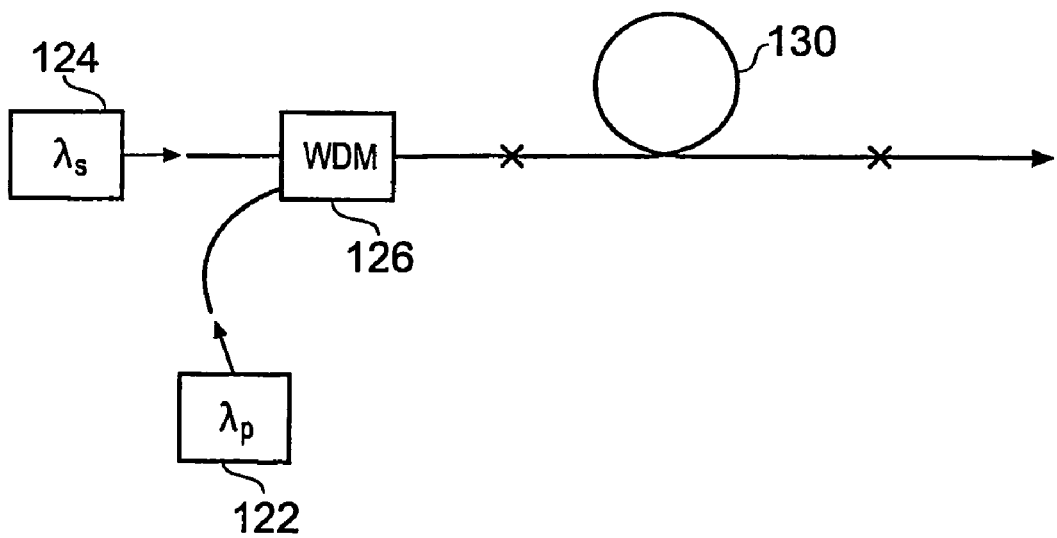
FIG. 24 shows a simplified schematic diagram of a Raman amplifier according to a further embodiment of the invention, comprising a large core area holey fibre.

In an alternative embodiment, the holey fibre can be of a type having a large core dimension. Typically, such a fibre has an effective core area of about 100 $\mu m^2$ or more, at a wavelength of 1550 nm. This offers the advantage that it is possible to couple higher optical power levels in the fibre whilst keeping the power density at the fibre facet at a lower level and thereby reducing the risk of facet damage. Such fibres are thus of interest for high power laser and amplifier applications. FIG. 24 is a schematic diagram of such an amplifier, where the holey fibre 130 has a large core area of 100 $\mu m^2$.

Distributed Amplifiers

Figure 25A:
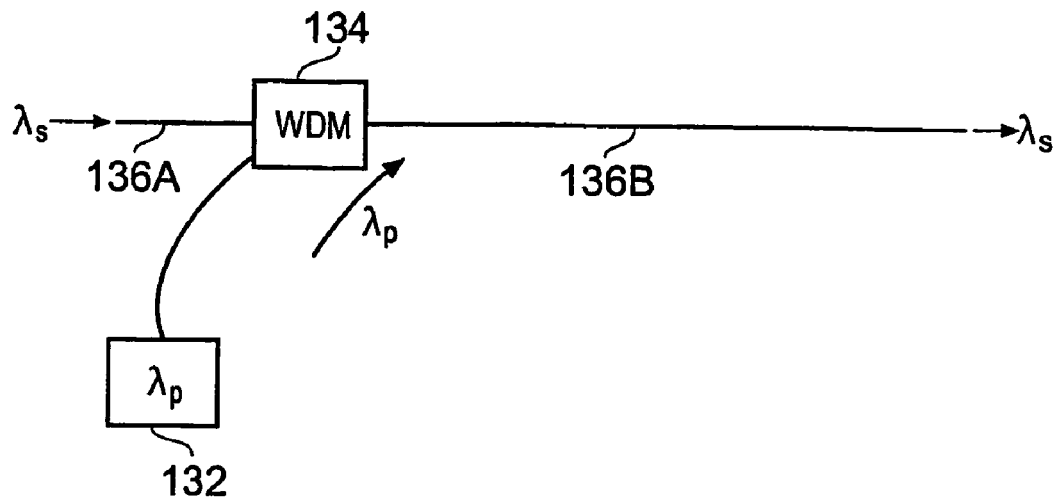
FIGS. 25(a) and 25(b) shows simplified schematic diagrams of Raman amplifiers according to a further embodiment of the invention, configured as distributed amplifiers.

If used in a telecommunications network, a holey fibre Raman amplifier according to the present invention can be configured as a distributed amplifier. This means that the fibre comprising the amplification medium also acts as the telecommunications signal-carrying fibre, so that amplification occurs in a continuous manner as the signal is transmitted. FIG. 25(a) is a simplified schematic diagram showing the basic elements of such a system. A first length of holey fibre 136A carries a signal wave at a wavelength $\lambda_s$, and is joined to a second length of holey fibre 136B by a WDM coupler 134. The WDM coupler 134 also couples pump light from a pump source 132 into the second length of holey fibre 136B. Thus, the signal wave and the pump wave propagate in the same direction along the second length of holey fibre 136B, the pump wave induces optical gain, and the signal wave is amplified as it travels. Further pump sources may be provided at intervals to boost the signal power if necessary, for example, if the power level is reduced by transmissions losses in the holey fibre.

Figure 25B:
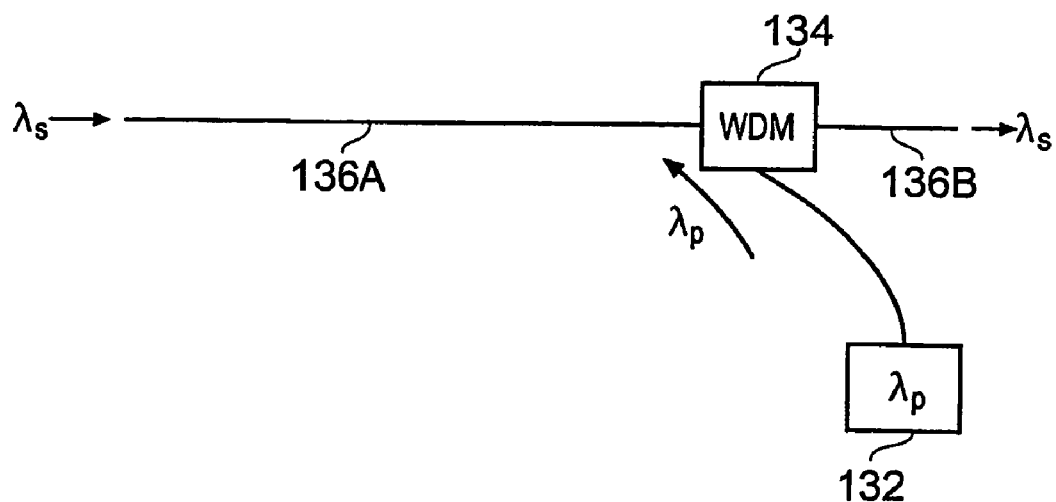

FIG. 25(b) shows an alternative configuration, in which the WDM 132 is arranged to couple the pump light into the holey fibre in a backward direction relative to the direction of travel of the signal wave. Backward pumping of this kind is generally preferred in telecommunications networks, because it ensures maximum randomisation of the relative polarisation of the pump and signal waves and eliminates patterning effects due to the fast gain dynamics of Raman amplifiers, so that the maximum amount of gain can be achieved in the absence of polarising elements. The holey fibre is non-polarisation maintaining fibre in this particular embodiment, although it need not be.

Hybrid Amplifiers

As mentioned, Raman amplifiers provide broadband optical gain. However, for some applications, it may be desirable to extend the bandwidth of the gain, or to modify the gain profile so that gain peak is broadened or flattened. This is addressed by an embodiment of the present invention, in which a holey fibre Raman amplifier is combined with a second amplifier of a different type and having a different gain profile, to provide a hybrid amplifier.

Figure 26A:
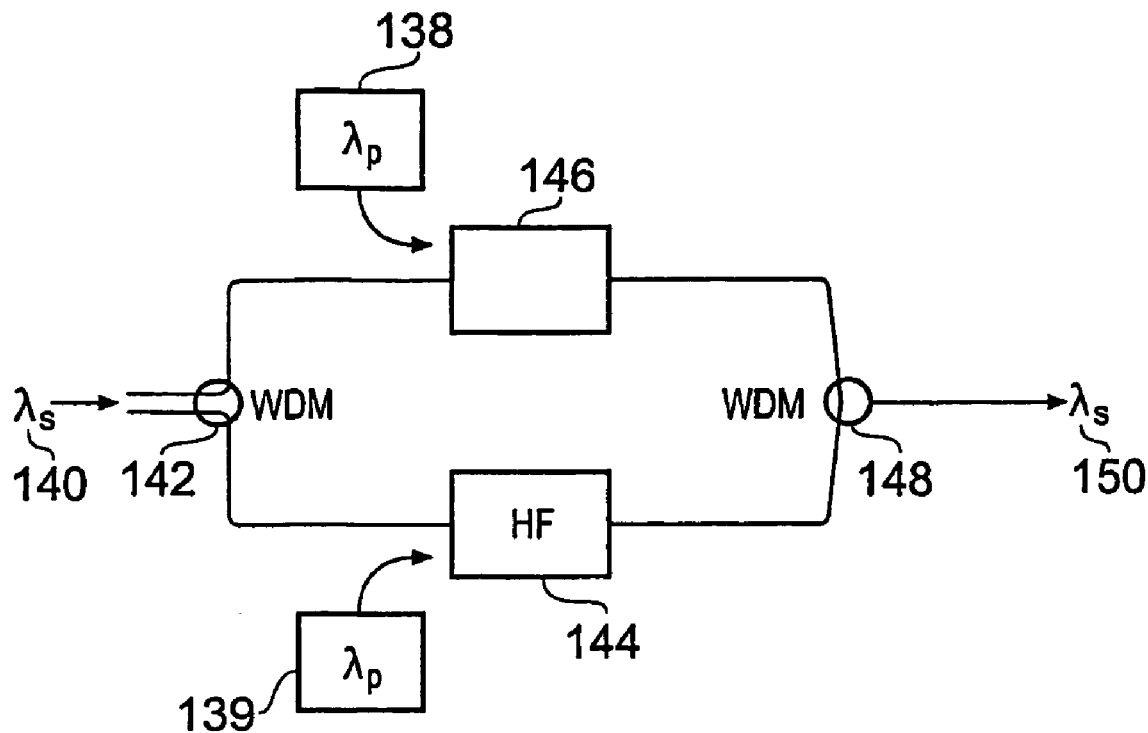
FIGS. 26(a) and 26(b) show a simplified schematic diagram of a hybrid Raman amplifier according to a further embodiment of the invention, and a graph of its gain profile.

FIG. 26(a) is a schematic diagram of such a device. A signal wave 140, enters a WDM coupler 142 where it is split into two wavelength components. One component enters a holey fibre Raman amplifier 144 of the kind described earlier, which has an associated pump source 139 and provides gain at the relevant signal wavelength. The other signal component enters a second fibre amplifier 146, which has an associated pump source 138 and provides gain at the other signal wavelength. The pump sources 138, 139 typically generate pump waves of different wavelengths, but this will depend on the gain characteristics of the two amplifiers and the desired gain spectra of each of them.

The two signal components are amplified in their respective amplifiers and combined at a second WDM 148 to give a single amplified signal output 150.

Figure 26B:
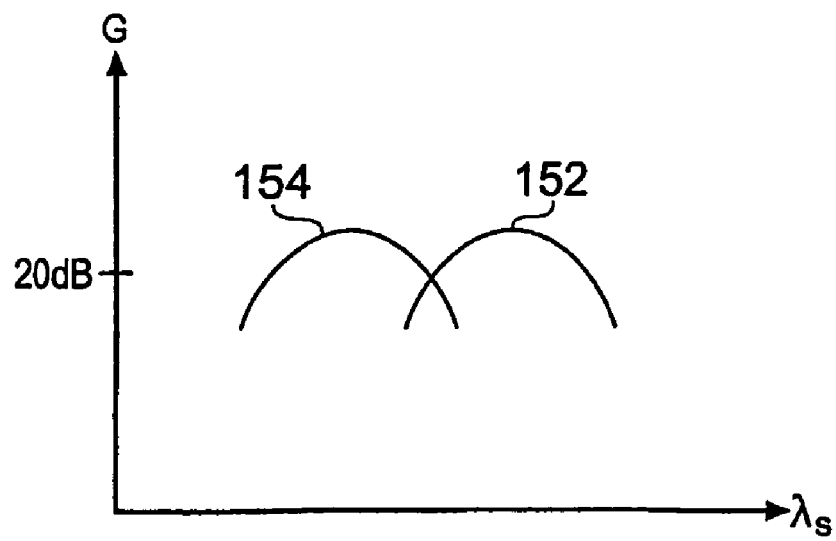

FIG. 26(b) is a graph showing gain G as a function of signal wavelength λs, to show how the overall gain of the hybrid amplifier is formed from the individual gains of the two constituent amplifiers. The holey fibre amplifier 144 has a gain profile with a peak 152, whereas the gain peak 154 of the second amplifier 146 is at a shorter wavelength. The two peaks 152, 154 overlap, and give a broadened overall peak, so that a high level of gain is available for a wide range of signal wavelengths.

The alternative amplifier can be any suitable amplifier with a gain peak at the desired wavelength. For example, it may comprise an erbium doped fibre amplifier (EDFA), a thulium doped fibre amplifier (TDFA), an ytterbium doped fibre amplifier (YDFA), an erbium/ytterbium doped fibre amplifier, a semiconductor optical amplifier (SOA) or a praseodymium doped fibre amplifier (PDFA). Alternatively, a second holey fibre Raman amplifier could be used if the fibre was fabricated from a different material to that of the first holey fibre Raman amplifier, so as to give a different gain profile. A conventional fibre Raman amplifier having standard optical fibre as the Raman gain medium could also be used. Additionally, the gain of the hybrid amplifier may be further modified/extended by the provision of one or more further amplifiers, arranged in parallel to the first two amplifiers and having various gain profiles.

Optical Isolation

In various embodiments, the holey fibre Raman amplifier can include one or more optical isolators. These are devices which allow propagation of a specified wavelength in one direction only, and can hence be used to block undesirable back (or forward) propagation. This is particularly useful for protecting various parts of an optical system from noise. In the case of a Raman amplifier, this is typically in the form of amplified spontaneous scattering or Rayleigh scattering. It may be desired to protect the pump optical source and/or the signal optical source from such noise, as it may perturb laser operation within the sources. Within the amplifier itself, noise can cause the gain to saturate, and hence reduce the efficiency of the amplification process. It can also contribute to undesirable Rayleigh backscattering.

Figure 27A:
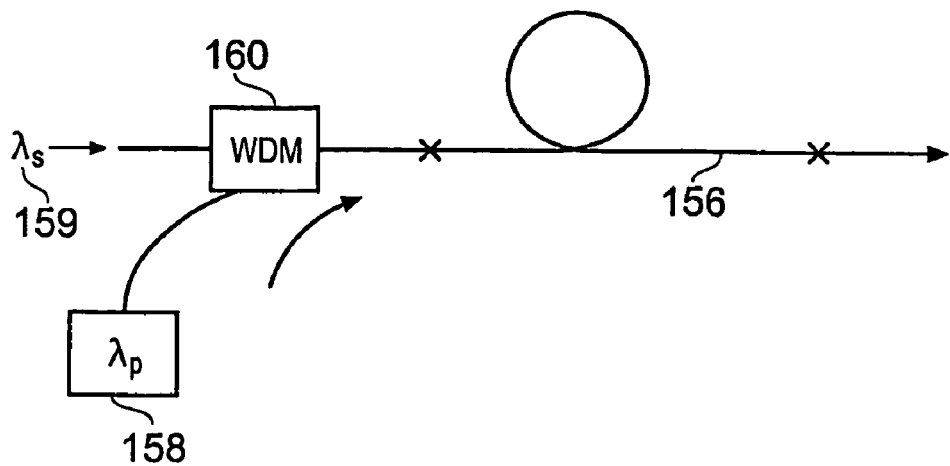
FIGS. 27(a), 27(b), 27(c), 27(d), 27(e), 27(f) and 27(g) show simplified schematic diagrams of Raman amplifiers according to a further embodiment of the invention, comprising one or more optical isolators.

FIGS. 27(b) to 27(g) are schematic representations of various embodiments of holey fibre Raman amplifier incorporating one or more isolators. In each case, the amplifier is a simple system comprising a holey fibre 156 into which pump light is coupled from a pump source 158, and signal light $\lambda_s$ 159 is coupled either from a dedicated source, or as a signal travelling in a telecommunications network. The coupling is achieved via a WDM coupler 160. FIG. 27(a) shows this arrangement with no isolators.

Figure 27B:
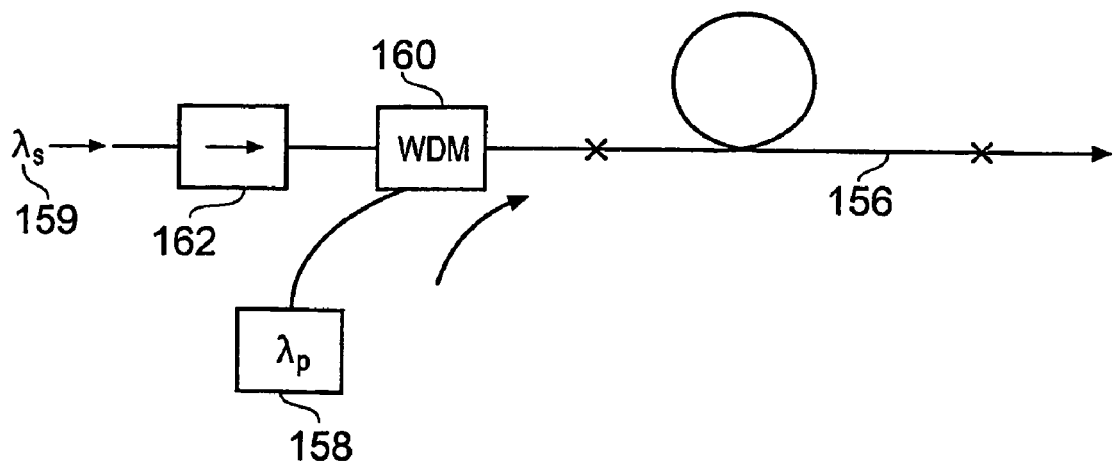
Figure 27C:
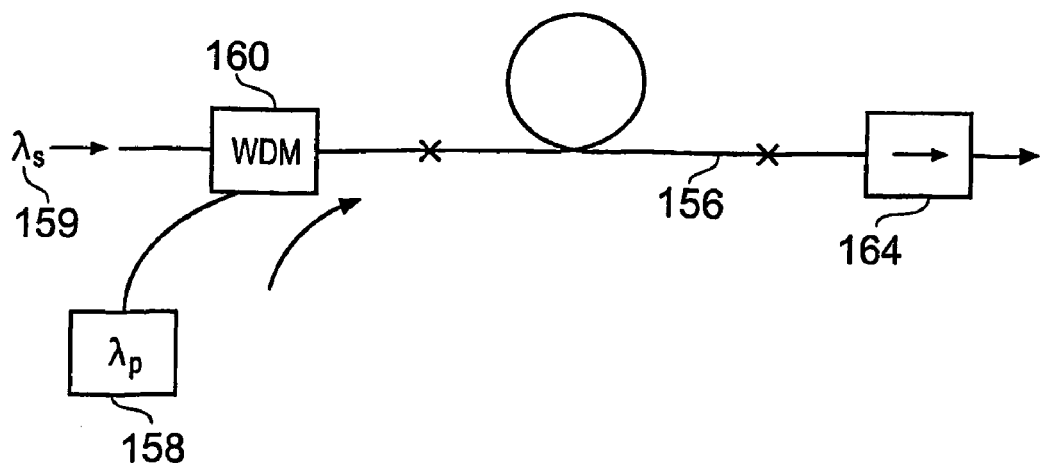
Figure 27D:
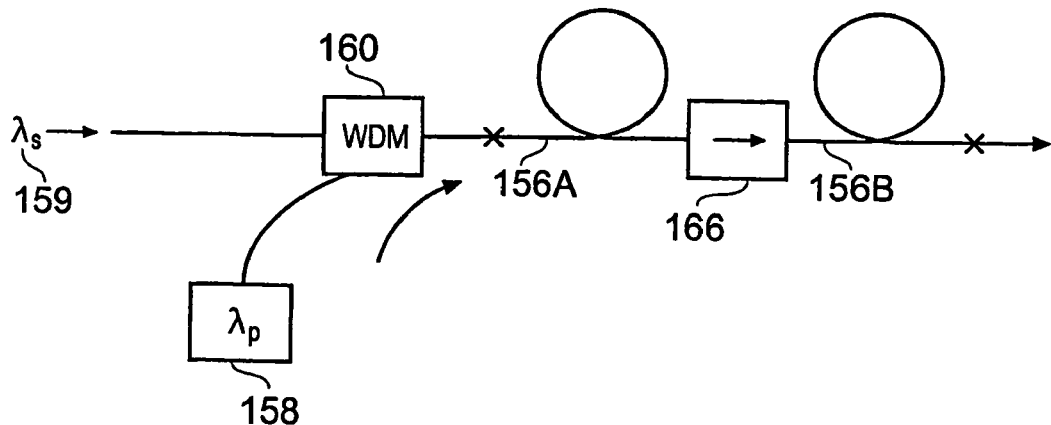

FIG. 27(b) has a single isolator 162 positioned on the signal wave input to the WDM coupler 162, which will protect the signal source and/or any earlier components in the system from noise arising from the amplifier. FIG. 27(c) also has a single isolator 164, but in this embodiment it is positioned after the holey fibre 156, and will hence protect the whole amplifier from noise arising from any later components in the system. The embodiment of FIG. 27(d) also features a single isolator 166, positioned in this case at a midway point along the holey fibre 156, so as to protect the first part of the fibre 156A from back-propagating noise generated in the second part of the fibre 156B.

Figure 27E:
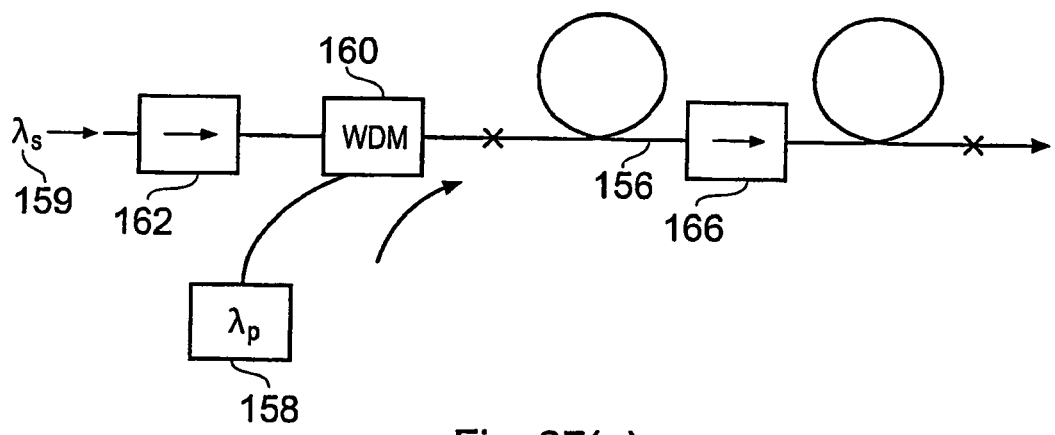
Figure 27F:
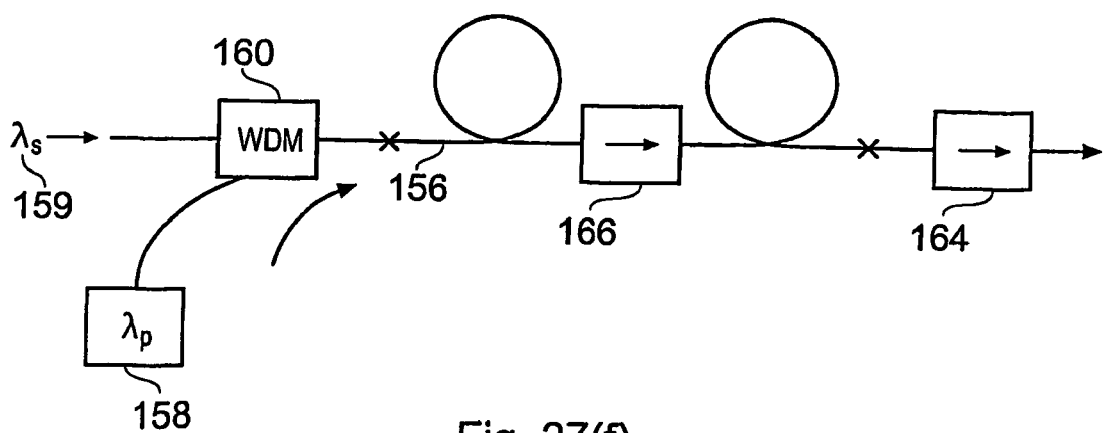

FIGS. 27(e) and (f) shows embodiments with two isolators. FIG. 27(e) shows a first isolator 162 positioned before the WDM coupler 160 as in FIG. 27(b), and a second isolator 166 positioned along the holey fibre 156 as in FIG. 27(d). FIG. 27(f) also shows an isolator 166 positioned along the holey fibre 156, but in combination with a second isolator 164 positioned after the holey fibre 156, as in FIG. 27(c).

Figure 27G:
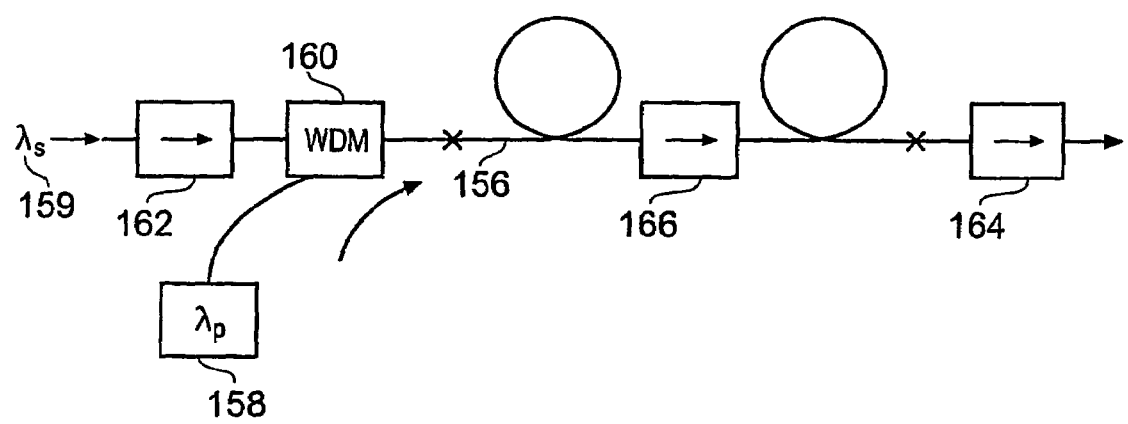
Figure 28A:
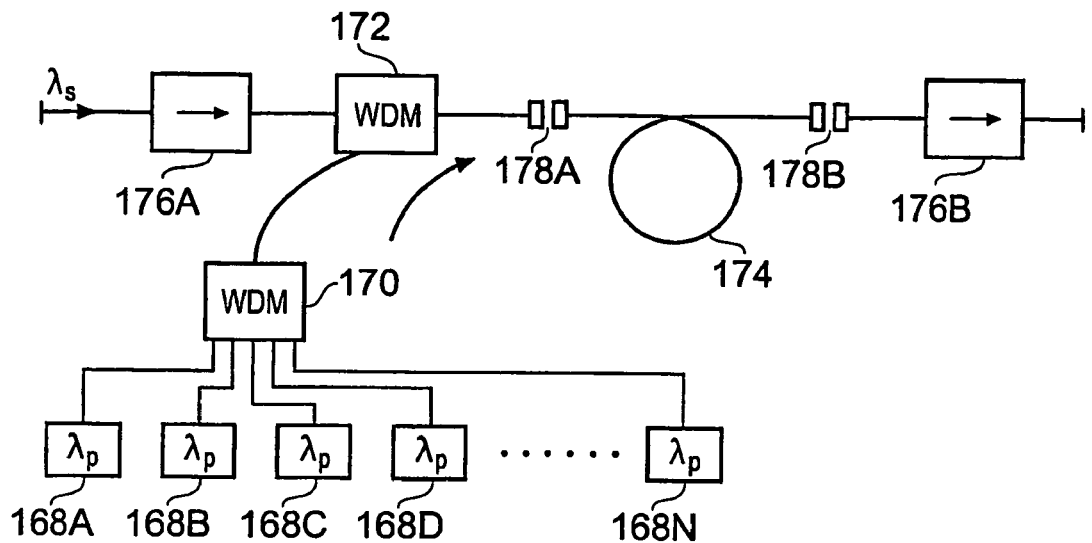
FIGS. 28(a), 28(b), 28(c), 28(d), 28(e) and 28(f) show simplified schematic diagrams of Raman amplifiers according to a further embodiment of the invention, comprising multiple pump sources.
Figure 28B:
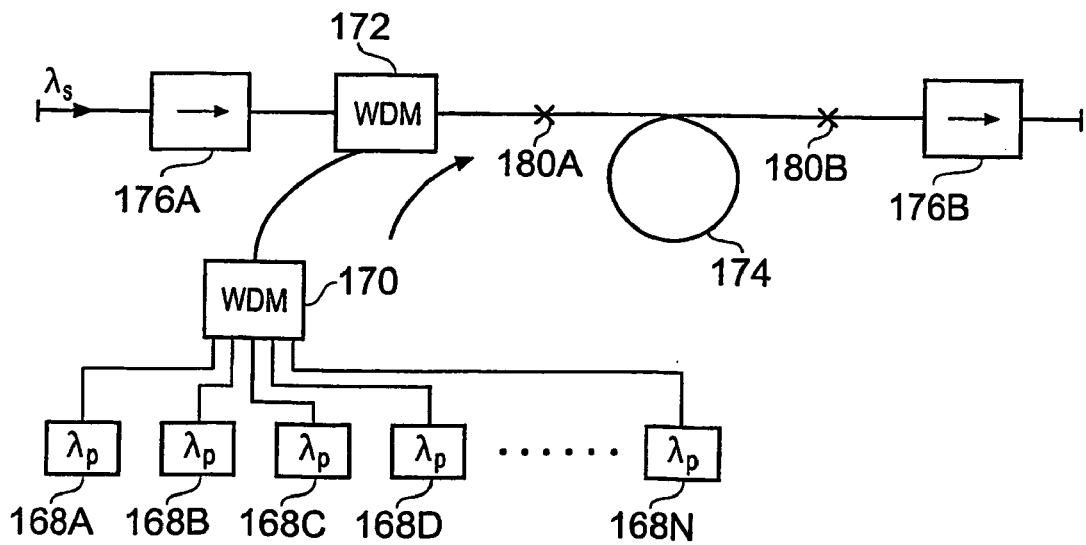
Figure 28C:
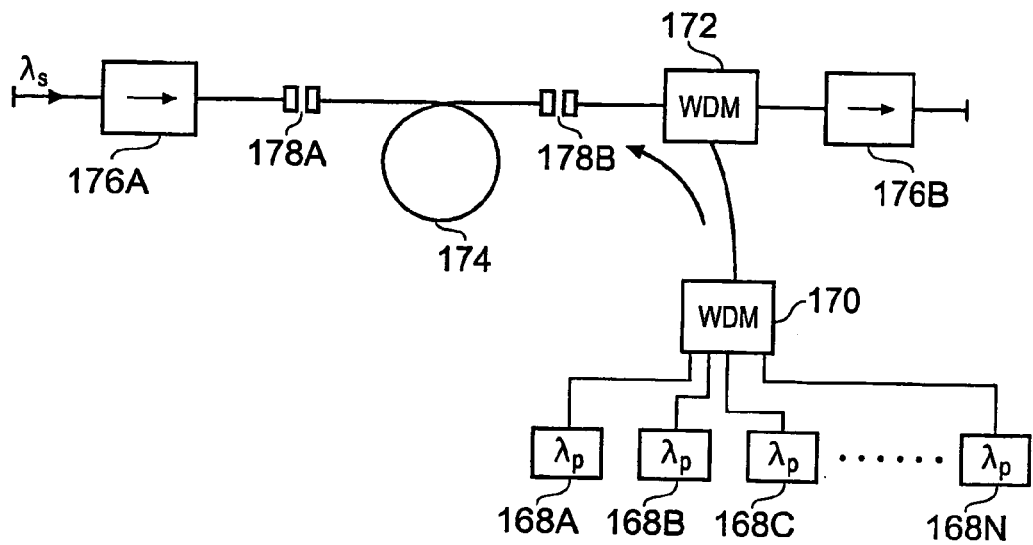
Figure 28D:
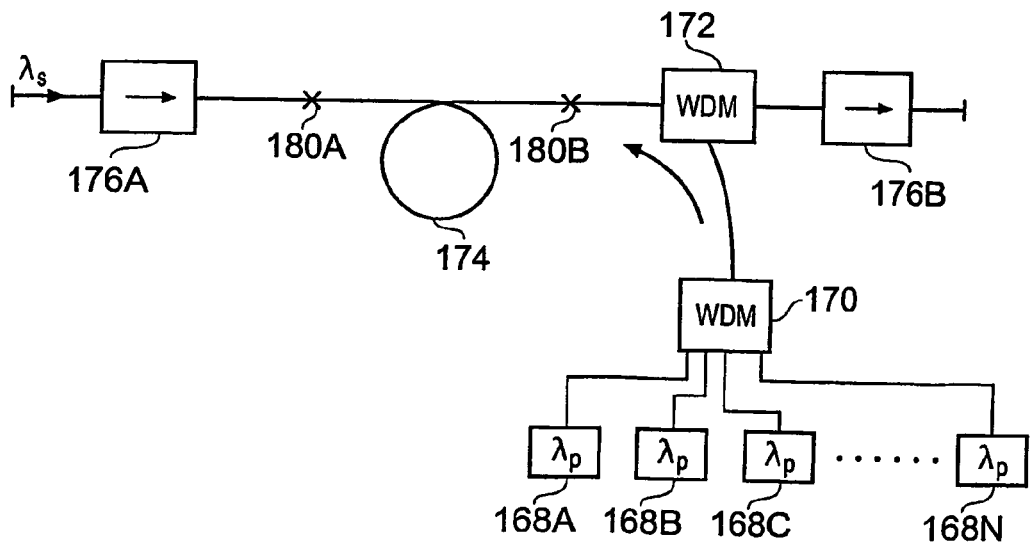
Figure 28E:
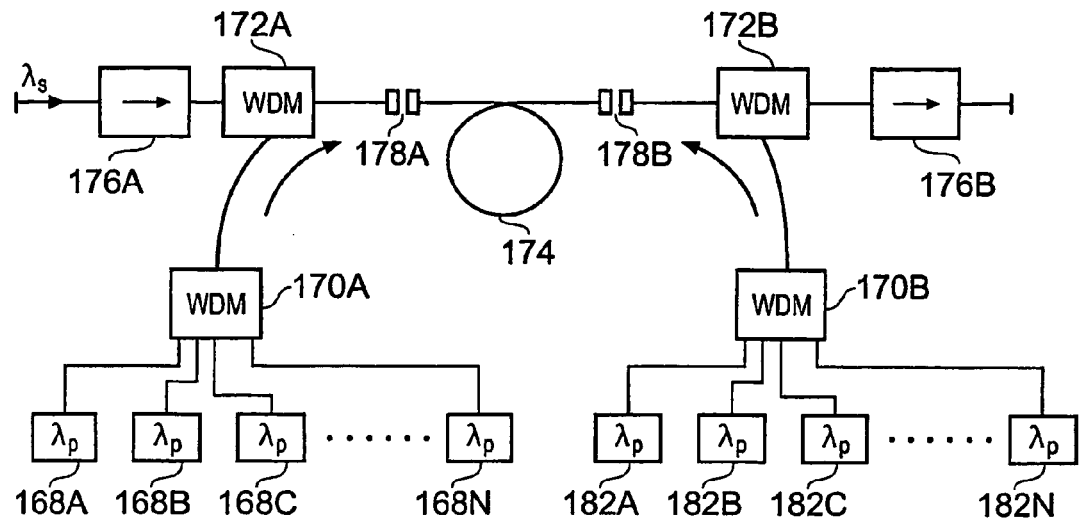
Figure 28F:
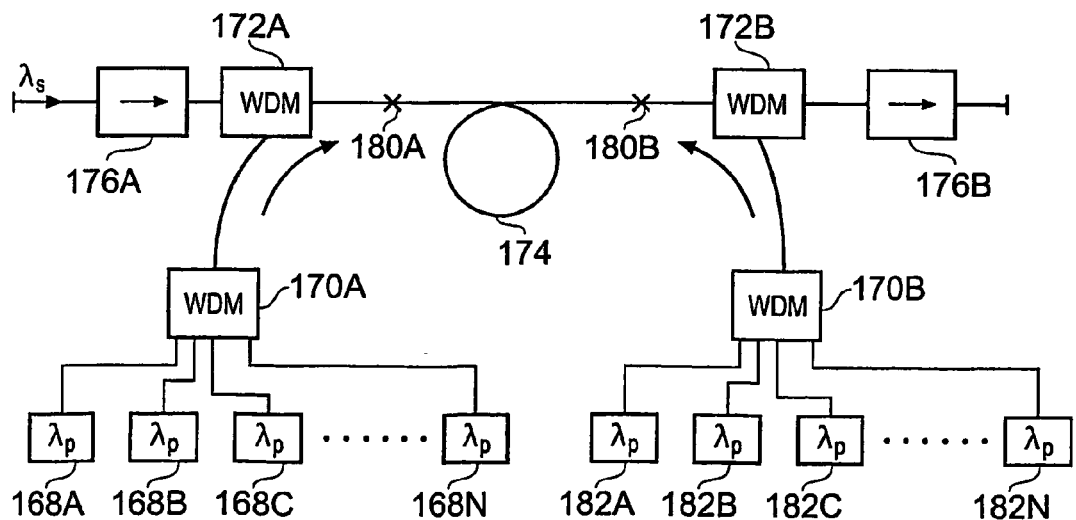
Figure 29A:
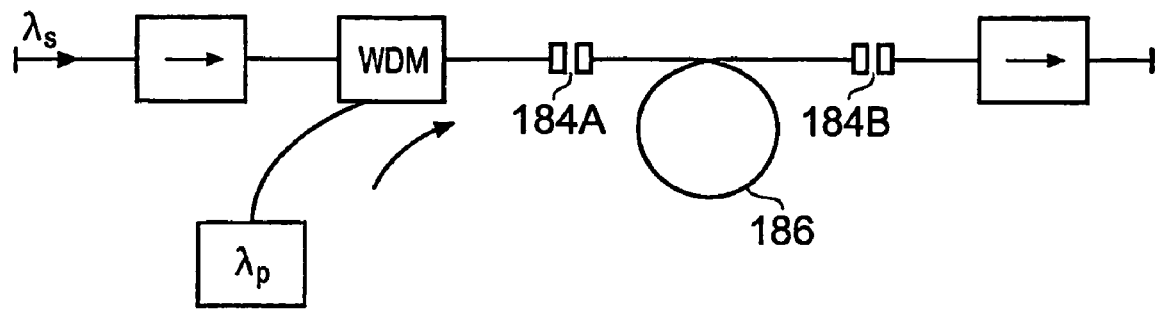
FIGS. 29(a), 29(b), 29(c), 29(d), 29(e) and 29(f) show simplified schematic diagrams of Raman amplifiers according to further embodiments of the invention, comprising different fibre coupling arrangements and different pumping arrangements.
Figure 29B:
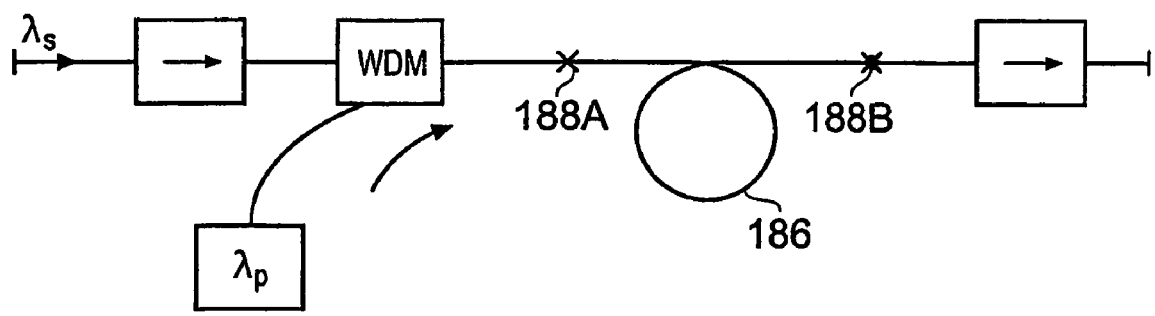
Figure 29C:
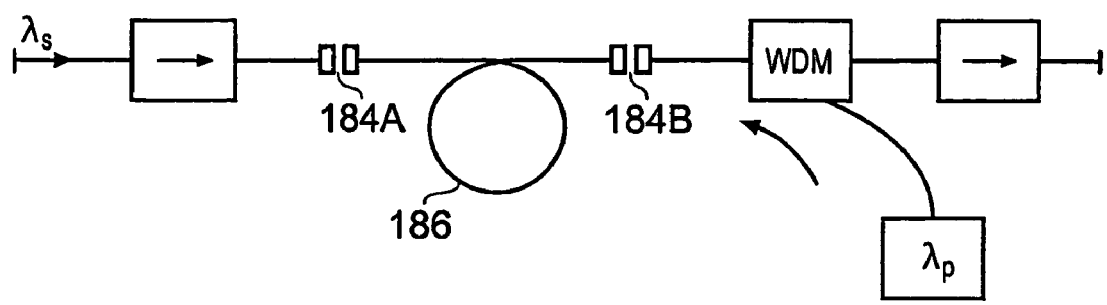
Figure 29D:
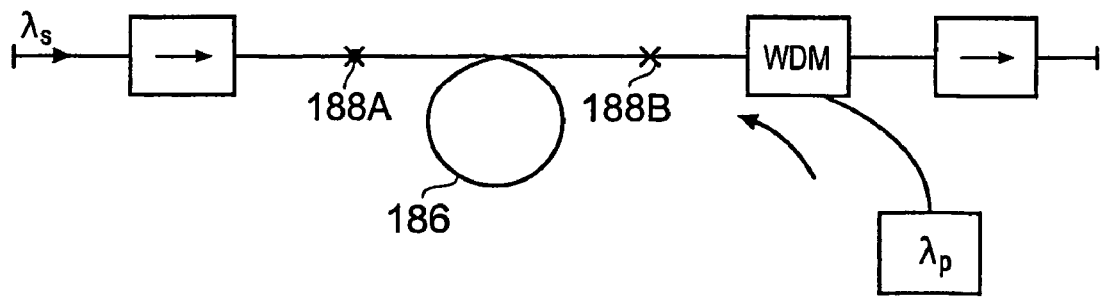
Figure 29E:
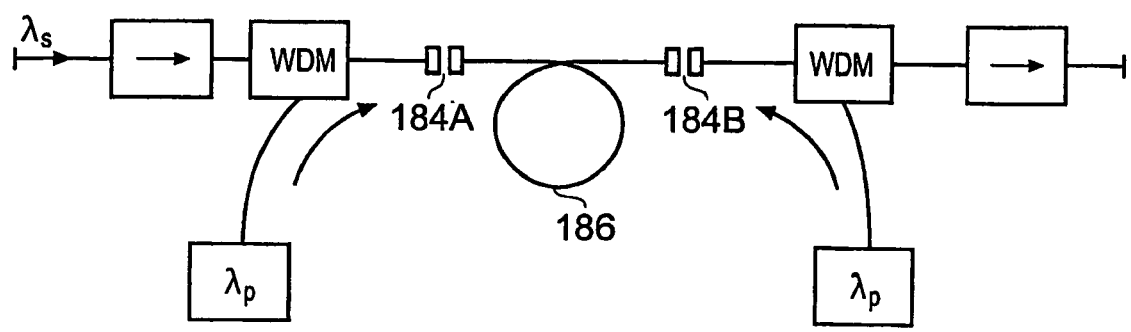
Figure 29F:
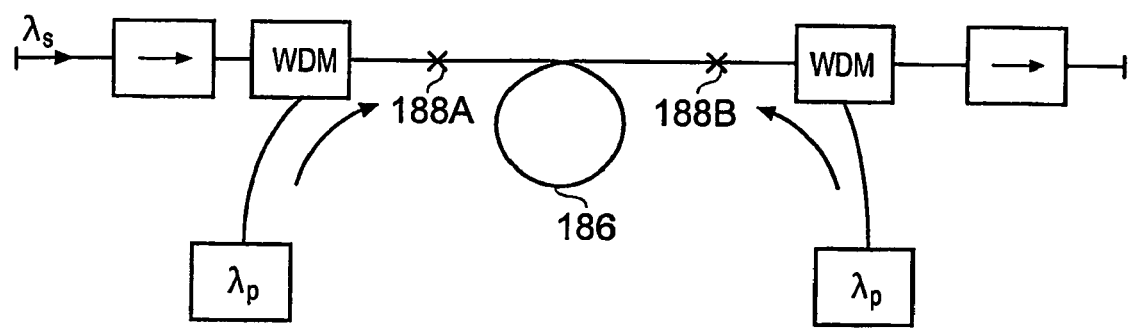

FIG. 27(g) shows an embodiment having isolators in all three of the described positions; one 162 before the WDM coupler 160, one 166 at a midpoint along the holey fibre 156 and one 164 after the holey fibre 156.

FIGS. 27(b) to (g) all show amplifiers arranged for forward pumping, so that the pump and signal waves co-propagate along the holey fibre. Alternatively, the amplifiers can be arranged for back pumping, as described with reference to the embodiment shown in FIG. 25(b). In a further alternative, a bidirectional pumping scheme can be employed, in which two pump sources are provided at the same wavelength, one arranged for forward pumping and one for back pumping.

Multiple Pump Sources

Other pumping arrangements that can be employed in the holey fibre Raman amplifier are those incorporating a plurality of pump sources, the outputs of which are coupled together using a WDM coupler before being launched into the holey fibre.

In some embodiments, the pump sources have outputs at the same wavelength. This gives an overall increase in available pump power and hence provides more gain. Also, some pump source redundancy can be provided, in which failure of one or more of the individual pump sources does not adversely affect the gain level compared with the required gain. In alternative embodiments, the pump sources have outputs at different wavelengths. This can be used to extend and/or tailor the overall gain profile of the amplifier, which is made up of the individual gain profiles generated by each of the pump wavelengths.

FIGS. 28(*a*) to 28(*f*) are schematic diagrams of various embodiments employing such pumping schemes. In each of the embodiments, a plurality of pump optical sources is provided, which can have outputs of the same wavelength, or two or more different wavelengths.

In FIG. 28(*a*), N pump optical sources 168A to 168N are provided, and their various outputs combined in a first WDM coupler 170. The combined pump waves are then coupled into a holey fibre 174 via a second WDM coupler 172, which is also used to couple a signal wave $\lambda_s$ into the holey fibre 174, so that a forward pumping configuration is used. The device also comprises a first isolator 176A positioned before the second WDM coupler 172 and a second isolator 176B positioned after the holey fibre 174, in accordance with the embodiments of FIGS. 27(*b*) and 27(*c*). Furthermore, the holey fibre 174 is a discrete length of fibre which is coupled to fibres forming the remainder of the device via lens arrangements 178A and 178B arranged one at each end of the fibre.

FIG. 28(*b*) shows a similar embodiment to that of FIG. 28(*a*), but in this case the lens arrangements are replaced by fusion splices 180A and 180B, which physically join the holey fibre 174 to the fibre on each end of it.

FIGS. 28(*c*) and 28(*d*) respectively show alternative embodiments incorporating equivalent components to those shown in FIGS. 28(*a*) and 28(*b*), but in which the pump sources are arranged for a back pumping scheme, like that shown in FIG. 25(*b*).

FIGS. 28(*e*) and 28(*f*) show further alternatives, in which a bi-directional pumping scheme is adopted. The forward and back pumping schemes of FIGS. 28(*a*) to 28(*d*) are employed together, so each of these two embodiments, features a second set of N pump sources, 182A to 182N, the outputs of which are coupled into the holey fibre 174 via firer first and second WDM couplers 170B and 172B.

Fibre Coupling

The choice between lens arrangements and fusion splicing shown in FIGS. 28(*a*) to 28(*f*) is not limited to amplifiers containing a plurality of pump sources. Either may be used with simpler systems having only a single pump source. FIG. 29(*a*) shows such an amplifier, in which lens arrangements 184A and 184B are located at either end of the holey fibre 186. A forward pumping scheme is employed. FIG. 29(*b*) shows a similar amplifier, in which fusion splices 188A and 188B are used to join the holey fibre 186 to neighbouring fibres. Alternative arrangements showing the use of lens arrangements or fusion splicing in amplifiers using back pumping and bi-directional pumping are shown respectively in FIGS. 28(*c*) to 28(*f*). Splicing is preferable from a practical perspective since it reduces connection loss and is more convenient, reliable and stable.

Fibre Materials

Figure 30:
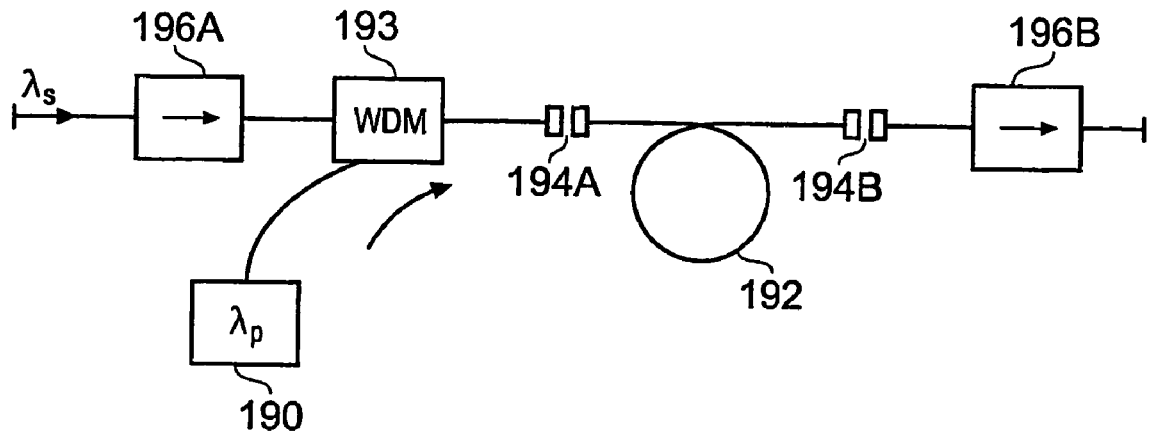
FIG. 30 shows a simplified schematic diagram of a Raman amplifier according to a further embodiment of the invention, comprising a pure silica holey fibre.

Other embodiments of the Raman amplifier use holey fibre having various material compositions. The first and second embodiments described above used holey fibre made from pure silica. The fact that holey fibre can be fabricated from a single material (in contrast with standard fibre, which requires two materials to provide the required refractive index difference between the core and the cladding) is beneficial in that it is possible to provide a fibre with a higher power handling capability than that available from using two or more materials in the same fibre. This is particularly true of silica fibre. For example, with certain silica holey fibres used in embodiments of the invention, continuous wave field strengths of 0.2 GW/cm$^2$ have been achieved. However, other pure materials can be used instead of silica, to tailor the power handling capability as desired. FIG. 30 is a schematic diagram of a simple Raman amplifier in which a pure silica holey fibre is used as the Raman gain medium. Pump light from a single pump source 190 is forward pumped into the pure silica holey fibre 192 via a WDM 193 also used to couple a signal wave $\lambda_s$, via an isolator 196A. A further isolator 196B is provided after the holey fibre 192, which is coupled to the rest of the device by lens arrangements 194A and 194B. Alternatively, a back pumping or bi-directional pumping scheme can be used.

Figure 31:
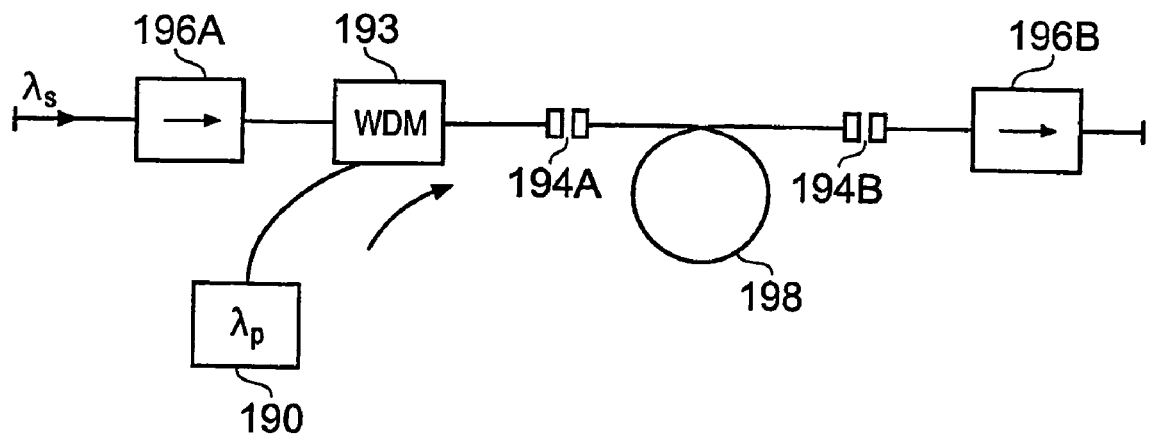
FIG. 31 shows a simplified schematic diagram of a Raman amplifier according to a further embodiment of the invention, comprising a germanium-doped holey fibre.

FIG. 31 shows a similar amplifier to that of FIG. 30, except that the pure silica holey fibre 192 is replaced with a silica holey fibre 198 having a core doped with germanium. The germanium gives the fibre a higher nonlinearity than that of pure silica, so that higher Raman gains can be achieved, and hence higher levels of amplification. Also, because the germanium is confined to the core, it is the fundamental mode of the fibre which experiences the improved gain. This gives the fundamental mode a strategic advantage over higher order modes in holey fibres capable of supporting multimode guidance, so that single mode operation of the amplifier is enhanced. Alternatively, the whole of the holey fibre may be made from germanium-doped material, which provides the improved gain without the improved mode performance. Other embodiments use holey fibres having alternative dopants, such as phosphorus, boron, tin, lead, bismuth, antimony, erbium, ytterbium or aluminium, fabricated with the object of providing holey fibre which incorporates more than one material in its cross-section, to modify the nonlinear properties and mode characteristics.

Figure 32:
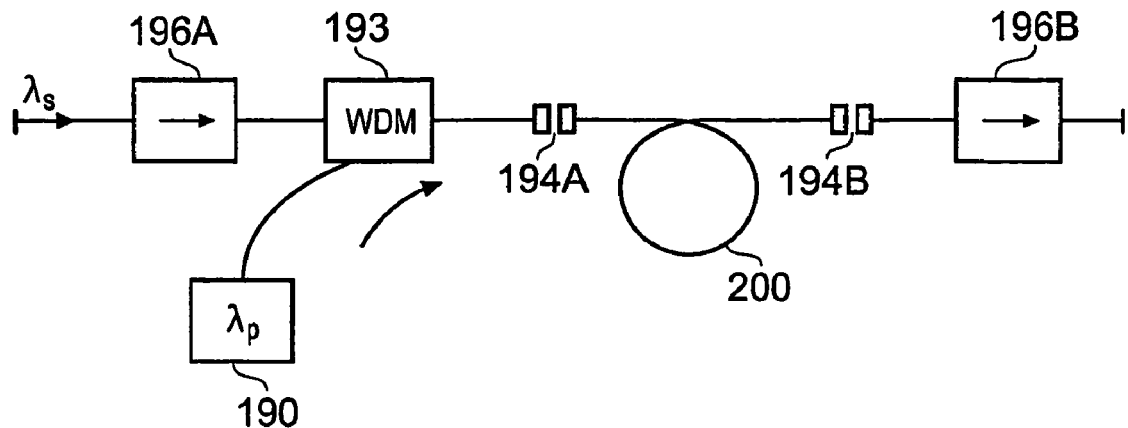
FIG. 32 shows a simplified schematic diagram of a Raman amplifier according to a further embodiment of the invention, comprising gallium lanthanum sulphide glass holey fibre.

A further alternative to pure silica is to use holey fibre fabricated from gallium lanthanum sulphide (GLS) glass. This compound glass material has a nonlinear coefficient approximately ten times that of silica, owing to a much higher refractive index. This means that a fibre length of only a few meters (typically 1 to 10 m) is sufficient to provide a useful amount of gain. Also, the Raman gain spectrum of GLS is very different to that of silica, so that GLS-based devices could be used generate, amplify and modulate different wavelengths. FIG. 32 shows a schematic diagram of a simple Raman amplifier with the same components as that shown in FIG. 30, in which the pure silica holey fibre 192 has been replaced with a much shorter length of GLS glass holey fibre 200.

Figure 33:
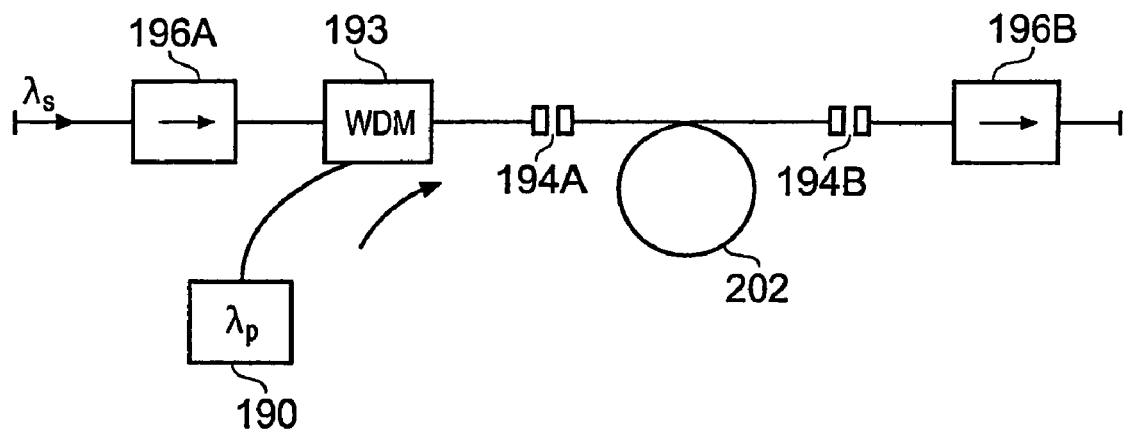
FIG. 33 shows a simplified schematic diagram of a Raman amplifier according to a further embodiment of the invention, comprising high index glass holey fibre.

The nonlinearity of the holey fibre can alternatively be increased by using other compound glasses (i.e. glasses other than silica), which can have a higher refractive index than that of silica, or a higher Raman gain coefficient/nonlinearity coefficient. Compound glasses are also often referred to as multi-component glasses, or soft glasses, and many of these have higher refractive index and nonlinear properties/coefficients than silica. As in the case of GLS glass holey fibre, embodiments of the present invention incorporating other compound glass holey fibre will have an advantageously short length and operating power requirement. FIG. 33 shows a schematic diagram of a simple Raman amplifier with components corresponding to those shown in FIG. 32, but having a length of alternative compound glass holey fibre 202 instead of holey fibre made from GLS glass.

Compounds glasses with properties of interest as regards holey optical fibres include:
Chalcogenides (e.g. S, Se or Te-based glasses);
Sulphides (e.g. Ge:S, Ga:La:S, As:S, Ge:Ga:S, Ge:Ga:La:S);
Oxy Sulphides (e.g. Ga:La:O:S);
Halides (e.g. ZBLAN (trade mark), ALF);
Lead glasses (e.g Schott (trade mark)glass SF57, SF59);
Sillicates (silicate, phosphosilicate, germanosilicate);
Chalcohalides (e.g. Sb:S:Br); and
Heavy Metal Oxides (e.g. PbO, ZnO, $TeO_2$).

Fibre Characteristics

A particularly beneficial feature of holey fibres as regards their application in Raman devices according to the present invention is that they can be made to be endlessly single mode, or effectively endlessly single mode at virtually all wavelengths. This means that both the pump wave and the signal wave in the Raman device are propagated as fundamental modes throughout the length of the fibre. The modal overlap between the two waves is hence very good at all times, which increases efficiency of the Raman process, giving improved gain or loss. Furthermore, an attractive feature of Raman devices is the ability to tune the peak of the gain profile simply by tuning the pump wavelength. A device comprising endlessly single mode holey fibre will maintain good modal overlap between the propagating waves throughout any tuning range utilised.

The endless single mode property can be achieved by fabricating holey fibre with a suitable value of d/Λ. Preferably, d/Λ is <0.3, <0.2 or <0.1. In conjunction with this, Λ may be >5 μm.

Fibres with values of d/Λ<0.3 or so are such that they offer single mode guidance for light over a very broad wavelength range and are often referred to as endlessly single mode fibres. In theory it is possible to say with certainty whether a given fibre is rigorously endlessly single mode or not (i.e. it supports just a single bound mode over a wide wavelength range). In practice it is often found that fibres that are theoretically multi-mode over certain wavelength ranges often behave as endlessly single mode fibres over wide wavelength regimes. This is due to the fact that mode-coupling within holey fibre structures is often weak due to large wavevector spacings between adjacent modes, and the fact that losses for higher order modes within holey fibres tend to be relatively much higher than the loss for the fundamental mode. In this sense fibres that theoretically at least are not endlessly single mode behave in practice as though they are endlessly single mode. Such fibres are referred to as effectively endlessly single mode fibres.

There are further design features of the holey fibre which can be considered. For example, the loss of different types of holey fibres varies greatly. Holey fibre with a relatively high loss can be used in embodiments of the present invention, compared to amplifiers using standard fibre, because the much shorter length of fibre used means that a higher loss value can be tolerated. Holey fibre with losses of <1 dB/km, <10 dB/km or <50 dB/km (at a wavelength of 1.5 μm) can typically be used, depending on the application. However, it is expected that lower loss holey fibres will give devices with higher gain.

Many different structures of holey fibre are also available, all of which are suitable to be used in various embodiments. The cladding of the holey fibre may incorporate holes arranged in two, three, four or more rings around the core, as required to give desired properties. In this way, fibre properties including refractive index, nonlinearity and dispersion can be tailored. Also, the holes may or may not be arranged in a periodic fashion. They may be graded in size or otherwise varied over the transverse cross-section of the fibre. The core diameter can be chosen as appropriate; diameters of <2 μm or <3 μm are typical for holey fibre, but other values can be used. All these variables can be used to tailor the fibre properties. Holey fibre designs having circular symmetry about the core are typically used for non-polarisation maintaining fibres, which can be made from spun holey fibre. Polarisation maintaining fibre, on the other hand, typically has a structure which is asymmetric about the core.

The holey fibre used to implement the above-described examples of the first and second embodiments of the invention has a high anomalous dispersion value. This does not play an important role in the operating regimes described, since the pulses used are quite long. It is, however, possible to use shorter pulses, in which case the high value of dispersion could be problematic, as it can lead to effects such as pulse broadening and distortion. Therefore, a lower dispersion value is preferred in such circumstances. Also, normal rather than anomalous dispersion is preferable, since the high intensity, short duration pulses can start to break-up in the anomalous dispersion regime, due to modulation instability, and even form optical solutions in some instances. Shorter pulses may be advantageous, to achieve higher peak powers and an enhanced nonlinear response and gain. Also, short pulses can be used to give a high bit rate for data modulation applications, as discussed above.

Operating Wavelengths

While one of the advantages of embodiments of holey fibre Raman amplifiers of the present invention is the ability to achieve gain and amplification at wavelengths outside the narrow bandwidth of the EDFA, it is also possible to provide an amplifier according to the present invention which does operate in this wavelength range. The spectrum of Raman gain is dependent on the wavelength of the pump light used, so that a tunable amplifier can be provided by incorporating a tunable optical pump source, or alternatively, an amplifier operating at a desired wavelength can be provided by appropriate selection of the pump wavelength. For a device based on pure silica holey fibre, in which the pump wavelength is separated from the gain peak by ~13 THz, amplification covering the various telecommunication wavelength bands can be achieved by using pump light of the following wavelengths:

| Band | Signal Wavelength (nm) | Pump Wavelength (nm) |
|---|---|---|
| C (conventional) | 1530–1560 | ~1430 |
| L (long) | 1590–1610 | ~1480 |
| L+ | 1610–1640 | ~1530 |
| S (short) | 1500–1530 | ~1400 |
| S+ | 1490–1500 | ~1360 |
| 1300 nm band | 1300 | ~1200 |

It is desirable to utilise as much of these bands as possible (by multiplexing many signal wavelengths) to increase the signal carrying capacity of a telecommunications network. Amplifiers according to embodiments of the present invention provide an advantageous way of potentially achieving this aim.

Pump Sources

Various sources are suitable and available for use as pump optical sources for embodiments of the invention, for the generation of pump light with various wavelengths. Examples include the erbium-doped fibre laser (EDFL), which operates at ~1530 to 1600 nm; tunable and non-tunable semiconductor laser diodes, which are available with outputs from 800 to 1600 nm; the Nd:YAG laser, which emits at 1064 nm; the argon ion laser, which typically generates light with a wavelength range of 490 to 515 nm; the ytterbium-doped fibre laser (YDFL), at around 1 µm; and erbium/ytterbium doped fibre lasers.

While the above-mentioned further embodiments have been described with reference to holey fibre Raman amplifiers, the various features are generally also applicable to Raman optical modulators and Raman lasers such as those of the second and third embodiments of the invention, and may advantageously be applied thereto.

According to various aspects of the present invention, there has been described an optical device comprising:

a first optical source operable to provide light at a first wavelength and a first power level;

a second optical source operable to provide light at a second wavelength which is longer than the first wavelength and at a second power level; and a holey optical fibre arranged to receive light from the first optical source and the second optical source and to increase the ratio of the second power level to the first power level by the effect of stimulated Raman scattering within the fibre.

The optical device may be configured as an optical amplifier, in which case the second power level is lower than the first power level; and the stimulated Raman scattering acts to amplify the second power level by providing optical gain at the second wavelength.

Alternatively, the optical device may be configured as an optical modulator, in which case the second power level is higher than the first power level; and the stimulated Raman scattering acts to reduce the first power level by providing optical loss at the first wavelength.

Alternatively, the optical device may be configured as a laser, in which case the holey optical fibre is provided with one or more reflective elements operable to provide optical feedback at the second wavelength; light at the second wavelength is provided by stimulated Raman scattering of light at the first wavelength within the holey optical fibre; and the stimulated Raman scattering acts to amplify the second power level by providing optical gain at the second wavelength sufficient to obtain laser operation.

REFERENCES

[1] P. B. Hansen, L. Eskildsen, S. G. Grubb, A. J. Stenz, T. A. Strasser, J. Judkins, J. J. DeMarco, R. Pedrazzani and D. J. DiGiovanni, "Capacity up-grades of transmission systems by Raman amplification", *IEEE Photonics Technology Letters,* 9(2) 1997.

[2] I. K. Ilev, R. W. Waynant, H. Kumagai and K. Midorikawa, "Double-pass fibre Raman laser—a powerful and widely tunable in the ultraviolet, visible and near-infrared fibre Raman laser for biomedical investigation", *IEEE Journal of Selected Topics in Quantum Electronics,* 5(4) 1999.

[3] G. Burdge, S. Alam, A. Grudinin, I. Khrushchev, M. Durkin, M. Ibsen and I White, "Ultrafast intensity modulation by Raman gain for all-optical in-fibre processing", *Optics Letters,* 23(8) 1998.

[4] R. H. Stolen, "Nonlinearity in fibre transmission", *Proceedings of the IEEE,* 68(10) 1980.

[5] S. T. Davey, D. L. Williams, B. J. Ainslie, W. J. M. Rothwell and B. Wakefield, "Optical gain spectrum of GeO2-SiO2 Raman fibre amplifiers", *IEE Proceedings Journal of Optoelectronics,* 32(20), 1989.

[6] H. Kubota, K. Suzuki, S Kawanishi, M. Nakazawa, M. Tanaka and M. Fujita, "Low-loss, 2 km-long photonic crystal fibre with zero GVD in the near IR suitable for picosecond pulse propagation at the 800 nm band", *Conference on Lasers and Electro-Optics,* number CPD3, 2001

[7] T. M. Monro, P. J. Bennet, N. G. R. Broderick and D. J. Richardson, "New possibilities with holey fibres", *Optical Fibre Communications Conference,* number ThG4, 2000.

[8] T. A. Birks, J. C. Knight and P. St. J. Russell, "Endlessly single-mode photonic crystal fibre", *Optics Letters,* 22(13), 1997.

[9] J. C. Knight, T. A. Birks, R. F. Cregan, P. St. J. Russell and J. P. de Sandro, "Large mode area photonic crystal fibre", *Electronics Letters,* 34(13), 1998.

[10] T. M. Monro, D. J. Richardson, N. G. R. Broderick and P. J. Bennett, "Holey optical fibres: an efficient modal model", *Journal of Lightwave Technology,* 17(6), 1999.

[11] N. G. R. Broderick, T. M. Monro, P. J. Bennett and D. J. Richardson, "Nonlinearity of holey optical fibres: measurement and future opportunities", *Optics Letters,* 24(20), 1999.

[12] P. M. Kjeldsen, M. Obro, J. S. Madsen and S. K. Nielsen, "SRS induced depletion of 1540 nm signal co-propagating with 1630 nm OTDR pulses", *Electronics Letters,* 32(20), 1996.

What is claimed is:

1. An optical fibre device which, in use, utilises the Raman effect, comprising:

a holey optical fibre with a structure which allows the fibre to guide the light at a first wavelength and a second longer wavelength and which results in energy transfer of light at the first wavelength propagating in the fibre to the second wavelength by the nonlinear optical process of Raman scattering within the fibre such that the ratio of optical power within the fibre at the second wavelength to optical power within the fibre at the first wavelength is increased, the holey optical fibre being fabricated from a first material and having a core region doped with a dopant that gives the holey optical fibre a higher nonlinearity than the first material;

a first optical source operable to emit light at the first wavelength with a first power level; and a coupler operable to couple light from the first optical source into the holey optical fibre so that the light undergoes Raman scattering.

2. An optical fibre device according to claim 1, and configured to be operable as an optical fibre amplifier, further comprising:

a coupler operable to couple light at the second wavelength with a second power level less than the first power level into the holey optical fibre;

the effect of the Raman scattering of the light from the first optical source being to provide optical gain at the second wavelength so that light at the second wavelength propagating within the fibre is amplified.

3. An optical fibre device according to claim 2, and further comprising a second optical source operable to emit light at the second wavelength with the second power level, the coupler being configured to couple light from the second optical source into the holey optical fibre.

4. An optical fibre device according to claim 2, and configured to be operable as a distributed amplifier for use in a telecommunications system, in which the coupler is arranged to couple optical signals at the second wavelength into the holey optical fibre so that said optical signals experience optical gain and are amplified while being transmitted along the holey optical fibre.

5. An optical fibre device according to claim 2, and further comprising:
   a second optical fibre amplifier operable to receive and amplify light at a third wavelength; and
   an output coupler operable to receive amplified light at the second wavelength from the optical fibre device and amplified light at the third wavelength from the second optical fibre amplifier, and to combine the amplified light into a single output.

6. An optical fibre device according to claim 5, in which the second optical fibre amplifier is one of: an erbium doped fibre amplifier; a ytterbium doped fibre amplifier; an erbium/ytterbium doped fibre amplifier; a praseodymium doped fibre amplifier; a thulium doped fibre amplifier; or a semiconductor optical amplifier.

7. An optical fibre device according to claim 1, and configured to be operable as an optical modulator, further comprising:
   a second optical source operable to emit light at the second wavelength with a second power level greater than the first power level; and
   a coupler operable to couple light from the second optical source into the holey optical fibre;
   the effect of the Raman scattering of the light from the first optical source being to cause optical loss at the first wavelength so the first power level is reduced.

8. An optical fibre device according to claim 7, in which the second optical source is operable to emit light at the second wavelength in the form of pulses, so that the optical loss varies in time.

9. An optical fibre device according to claim 8, in which the pulses have a duration of between 1 femtosecond and 100 nanoseconds.

10. An optical fibre device according to claim 8, in which the pulses have a duration of between 1 picosecond and 100 picoseconds.

11. An optical fibre device according to claim 1, and configured to be operable as an optical fibre laser,
   the effect of the Raman scattering being to provide optical gain at the second wavelength so that light at the second wavelength generated by the stimulated Raman scattering of the light from the first optical source is amplified;
   the device further comprising;
   one or more reflective elements having reflectivity at the second wavelength and arranged to cause multiple passes through the holey optical fibre of the light at the second wavelength so that laser action at the second wavelength is achieved.

12. An optical fibre device according to claim 11, in which the reflective elements comprise a pair of mirrors or bulk gratings arranged externally to the holey optical fibre.

13. An optical fibre device according to claim 1, in which the holey optical fibre is arranged in a ring configuration to allow light at the second wavelength to circulate around the ring.

14. An optical fibre device according to claim 10, in which the reflective elements comprise a pair of fibre Bragg gratings written into the holey optical fibre.

15. An optical fibre device according to claim 14, and further comprising one or more pairs of fibre Bragg gratings written into the holey optical fibre, and having reflectivities at one or more wavelengths longer than the second wavelength, so as to reflect light which is generated by Raman scattering of light at the second wavelength propagating within the fibre to the one or more longer wavelengths.

16. An optical fibre device according to claim 1, in which the holey optical fibre has a length within one of the following ranges 10 meters to 10,000 meters; 10 meters to 100 meters, or between 10 meters and 1000 meters, or between 100 meters and 1000 meters.

17. An optical fibre device according to claim 1, in which the holey optical fibre has a structure which is asymmetric about the core region so that the holey optical fibre is a polarisation maintaining fibre.

18. An optical fibre device according to claim 1, in which the holey optical fibre is capable of supporting multimode guidance and the doped core region gives higher gain for a fundamental mode of the fibre to improve single mode operation.

19. A optical fibre device to claim 1, in which the dopant comprises ions of one or more of: germanium, phosphorus, boron, tin, lead, bismuth, antimony, erbium, ytterbium and aluminium.

20. An optical fibre device according to claim 1, in which the first material is silica.

21. An optical fibre device according to claim 1, in which the first material is a compound glass.

22. An optical fibre device according to claim 21, in which the compound glass in gallium lanthanum sulphide glass.

23. An optical fibre device according to claim 21, in which the holey optical fibre has a length of between 1 and 10 meters.

24. An optical fibre device according to claim 1, in which the holey optical fibre is a large core area fibre, having a core region with an area greater than 100 $\mu m^2$ at the second wavelength.

25. An optical fibre device according to claim 1, in which the holey optical fibre has a structure comprising holes with a cross-sectional diameter d and a hole-to-hole spacing $\Lambda$ such that $d/\Lambda>0.6$ and an effective optical nonlinearity greater than 20 $W^{-1}$ $km^{-1}$.

26. An optical fibre device according to claim 25, in which $\Lambda<4$ $\mu m$.

27. An optical fibre device according to claim 25, in which $\Lambda<3$ $\mu m$.

28. An optical fibre device according to claim 25, in which $\Lambda<2$ $\mu m$.

29. An optical fibre device according to claim 25, in which $\Lambda<1.5$ $\mu m$.

30. An optical fibre device according to claim 1, in which the fibre has a structure comprising holes with a cross-sectional diameter d and a hole-to-hole spacing $\Lambda$ such that $d/\Lambda<0.3$ such that it provides endless single mode propagation at least the first wavelength and the second wavelength.

31. An optical fibre device according to claim 30, in which $\Lambda>5$ $\mu m$.

32. An optical fibre device according to claim 30, in which $d/\Lambda<0.2$ and $\Lambda>5$ µm.

33. An optical fibre device according to claim 30, in which $d/\Lambda<0.1$ and $\Lambda>5$ µm.

34. An optical fibre device according to claim 30, in which the holey optical fibre is effectively endlessly single mode fibre.

35. A method of amplifying light at a second wavelength, comprising:

provides light at a first wavelength with a first power level;

providing light at a second wavelength which is longer than the first wavelength with a second power level which is less than the first power level;

launching the light at the first wavelength and the light at the second wavelength into a holey optical fibre fabricated from a first material and having a core region doped with a dopant that gives the holey optical fibre a higher nonlinearity than the first material and with a structure which allows the fibre to guide light at a first wavelength and a second longer wavelength and which results in energy transfer of the light at the first wavelength to the second wavelength by the nonlinear optical process of Raman scattering within the fibre and hence provides optical gain at the second wavelength, so that the light at the second wavelength experiences the optical gain and is amplified.

36. A method of modulating the amplitude of light at a first wavelength, comprising:

providing light at a first wavelength with a first power level;

providing light of a varying amplitude at a second wavelength which is longer than the first wavelength and with a maximum power level which is greater than the first power level;

launching the light at the first wavelength and the light at the second wavelength into a holey optical fibre fabricated from a first material and having a core region doped with a dopant that gives the holey optical fibre a higher nonlinearity than the first material and with a structure which allows the fibre to guide light at a first wavelength and a second longer wavelength and which results in energy transfer of the light at the first wavelength to the second wavelength by the nonlinear optical process of Raman scattering within the fibre and hence provides optical loss at the first wavelength which varies in time, so that the light at the first wavelength experiences the varying optical loss and is modulated.

* * * * *